US011985490B2

(12) United States Patent
Thune

(10) Patent No.: US 11,985,490 B2
(45) Date of Patent: May 14, 2024

(54) SURROUND SOUND HEADPHONE DEVICE

(71) Applicant: Primer Studios, Corporation, Los Angeles, CA (US)

(72) Inventor: Greg Thune, Los Angeles, CA (US)

(73) Assignee: Primer Studios, Corporation, Los Angeles, CA (US)

( * ) Notice: Subject to any disclaimer, the term of this patent is extended or adjusted under 35 U.S.C. 154(b) by 126 days.

(21) Appl. No.: 17/832,540

(22) Filed: Jun. 3, 2022

(65) Prior Publication Data

US 2022/0394387 A1 Dec. 8, 2022

Related U.S. Application Data

(60) Provisional application No. 63/196,955, filed on Jun. 4, 2021.

(51) Int. Cl.
*H04R 5/033* (2006.01)
*H04R 1/10* (2006.01)

(52) U.S. Cl.
CPC ......... *H04R 5/0335* (2013.01); *H04R 1/1008* (2013.01); *H04R 1/105* (2013.01); *H04R 1/1075* (2013.01); *H04R 2460/11* (2013.01)

(58) Field of Classification Search
CPC .... H04R 5/0335; H04R 1/1008; H04R 1/105; H04R 2460/11; H04R 1/1075; H04S 5/00; H04S 7/00; H04S 2400/01; H04S 7/304
See application file for complete search history.

(56) References Cited

U.S. PATENT DOCUMENTS

| | | | | |
|---|---|---|---|---|
| 3,984,885 A | 10/1976 | Yoshimura | | |
| 4,821,323 A | 4/1989 | Papiernik | | |
| 5,519,783 A | 5/1996 | Kumar | | |
| 5,684,879 A | 11/1997 | Verdick | | |
| 6,038,330 A | 3/2000 | Meucci, Jr. | | |
| 6,263,085 B1 * | 7/2001 | Weffer | H04R 1/1075 | 381/186 |
| 7,289,641 B2 | 10/2007 | Yang | | |
| 8,000,486 B2 | 8/2011 | Hildebrandt | | |
| 8,041,067 B2 * | 10/2011 | Yang | H04S 3/004 | 381/370 |

(Continued)

FOREIGN PATENT DOCUMENTS

| | | |
|---|---|---|
| EP | 1071309 B1 | 9/2004 |
| FR | 2902272 A1 | 3/2012 |

(Continued)

*Primary Examiner* — David L Ton
(74) *Attorney, Agent, or Firm* — Law Offices of Judd M. Patton

(57) ABSTRACT

Herein described may be an embodiment of a surround sound headphone device for the production of surround sound which may comprise a first and second headphone assembly which may have acoustic chamber surrounds. The acoustic chamber surrounds may envelope a first and second acoustic chamber assembly. The first and second acoustic chamber assembly may have an acoustic chamber dividing partition, a one or more than one high frequency external port, a one or more than one low frequency external port, a one or more than one low frequency high frequency port, a one or more than one high frequency high frequency port, a one or more than one high frequency auditory source and, a one or more than one low frequency auditory source.

20 Claims, 16 Drawing Sheets

(56) References Cited

U.S. PATENT DOCUMENTS

| | | | | |
|---|---|---|---|---|
| 10,028,058 | B2 | 7/2018 | Anderson | |
| 2002/0181727 | A1 | 12/2002 | Shen | |
| 2003/0103637 | A1* | 6/2003 | Huang | H04R 1/1075 381/74 |
| 2004/0218775 | A1* | 11/2004 | Huang | H04R 5/033 381/186 |
| 2005/0238189 | A1* | 10/2005 | Tsai | H04R 1/1075 381/370 |
| 2007/0195984 | A1* | 8/2007 | Yang | H04R 1/1075 381/372 |
| 2008/0279404 | A1 | 11/2008 | Kuo | |
| 2009/0060238 | A1* | 3/2009 | Yang | H04R 5/033 381/309 |
| 2009/0060248 | A1* | 3/2009 | Yang | H04R 1/1075 381/374 |

FOREIGN PATENT DOCUMENTS

| | | | |
|---|---|---|---|
| JP | 2006222962 | A | 8/2006 |
| WO | 1999039546 | A1 | 8/1999 |

* cited by examiner

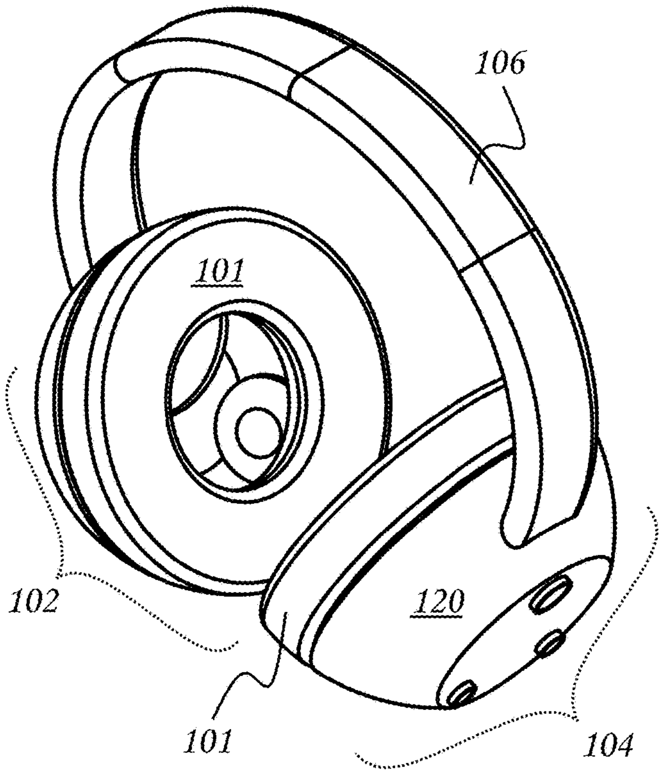
FIG. 1
FIG. 2
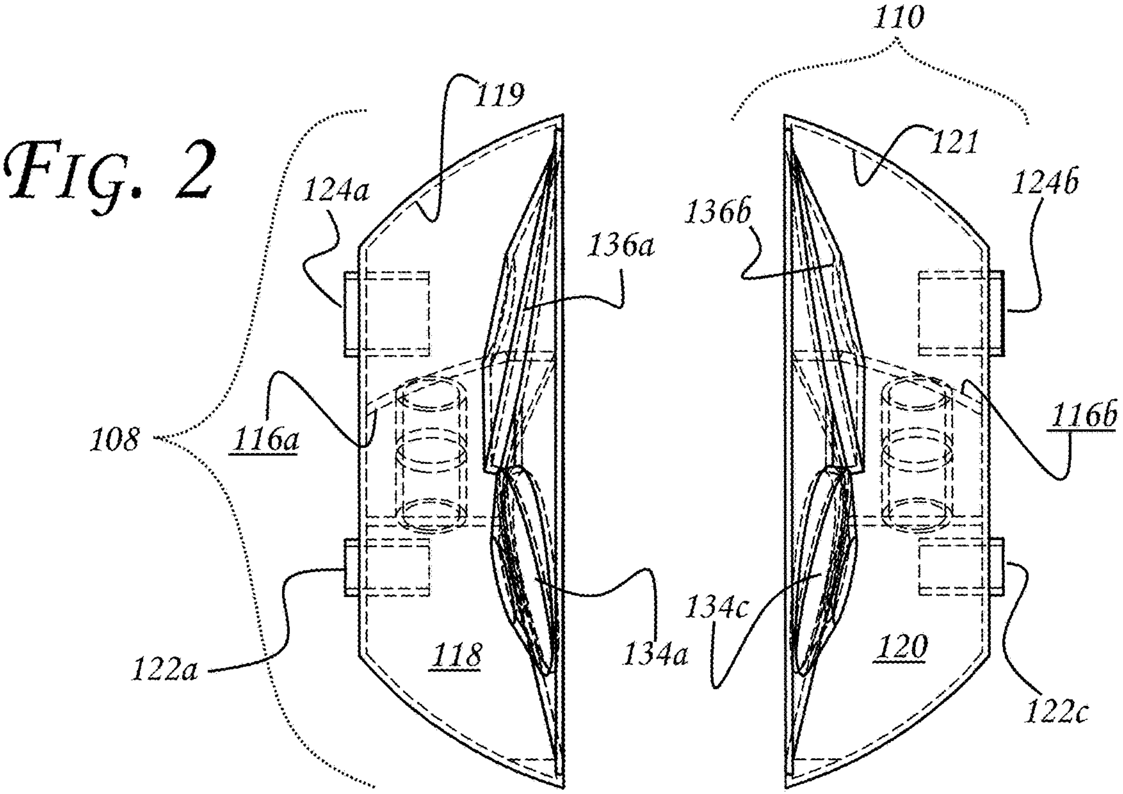

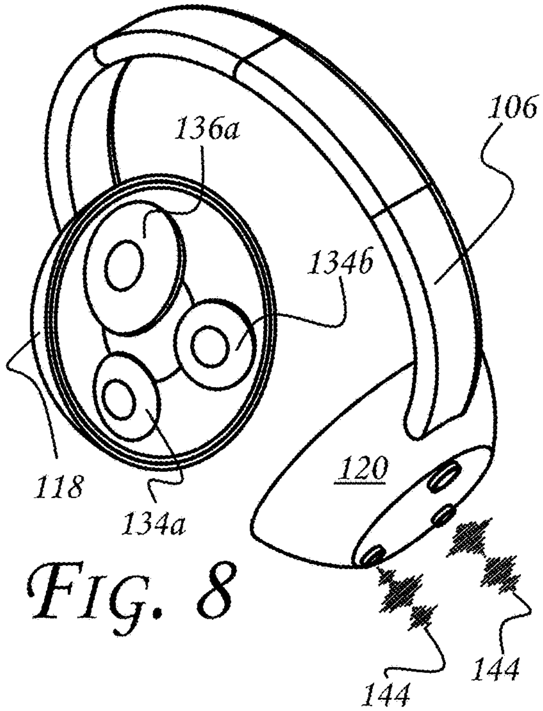
FIG. 8
FIG. 9
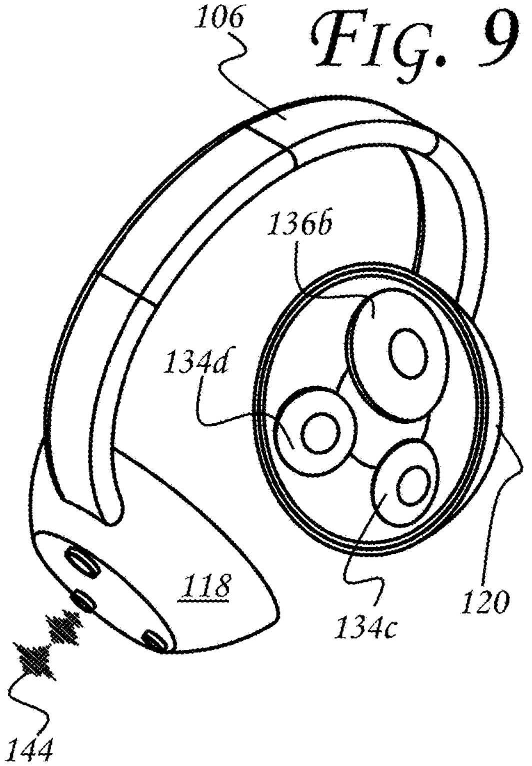
FIG. 10
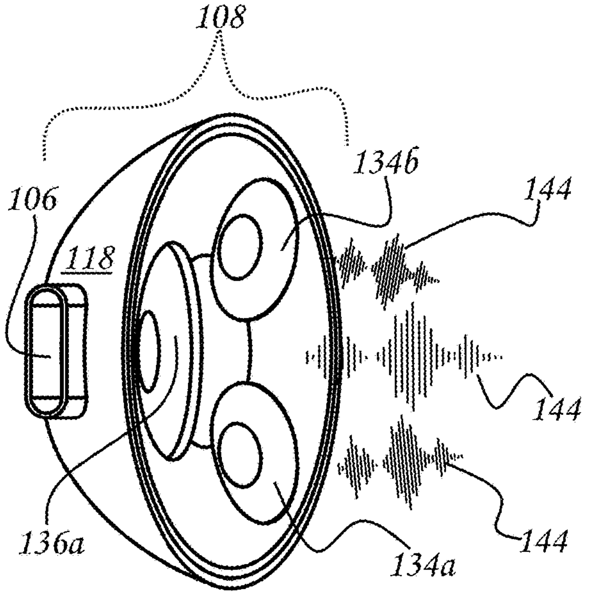
FIG. 11
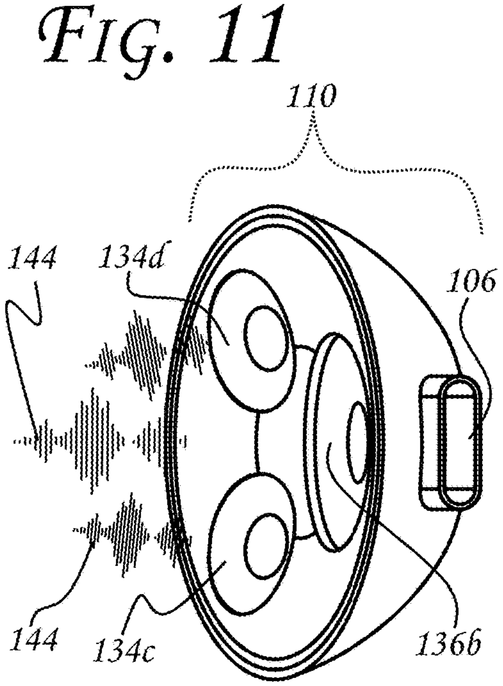

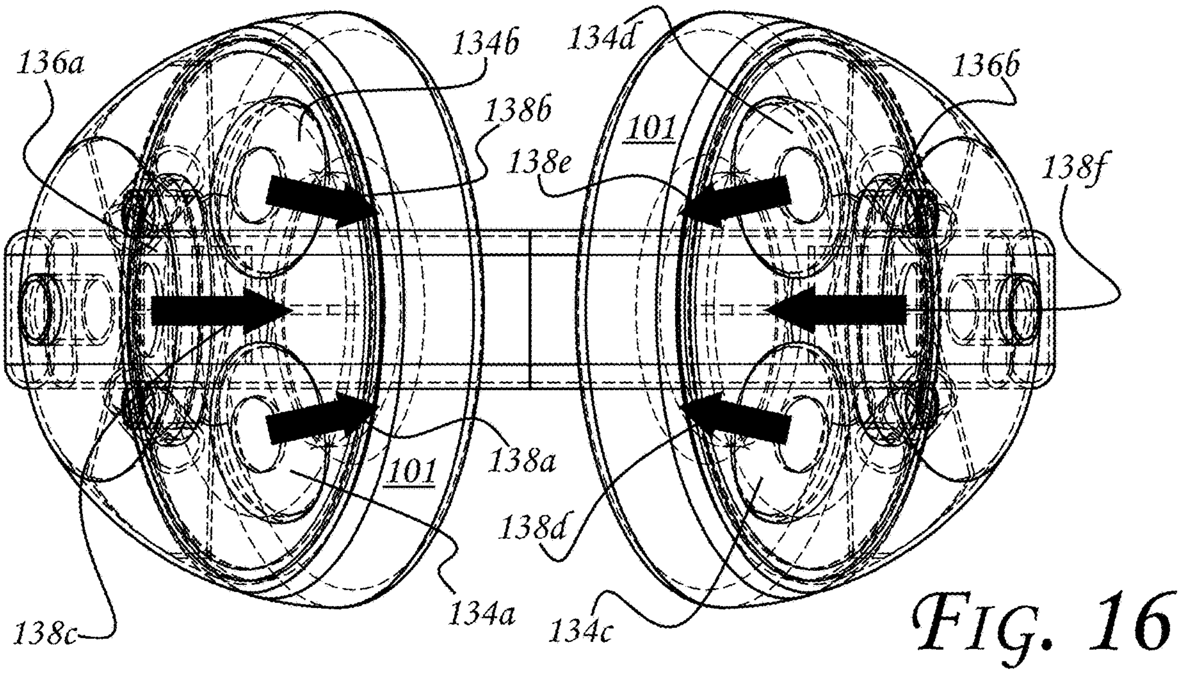
FIG. 16
FIG. 17
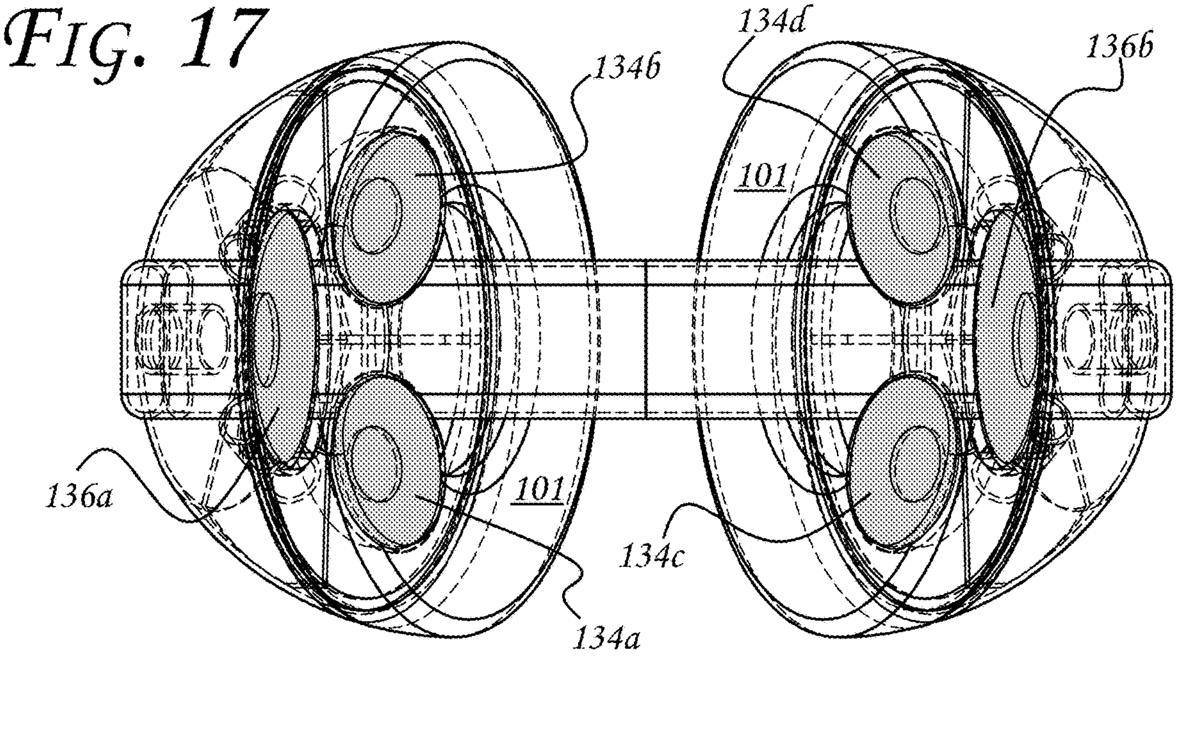

FIG. 21
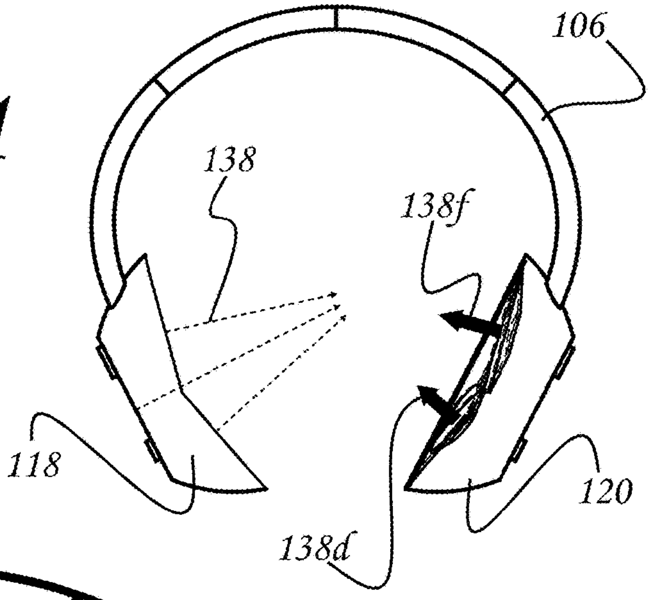
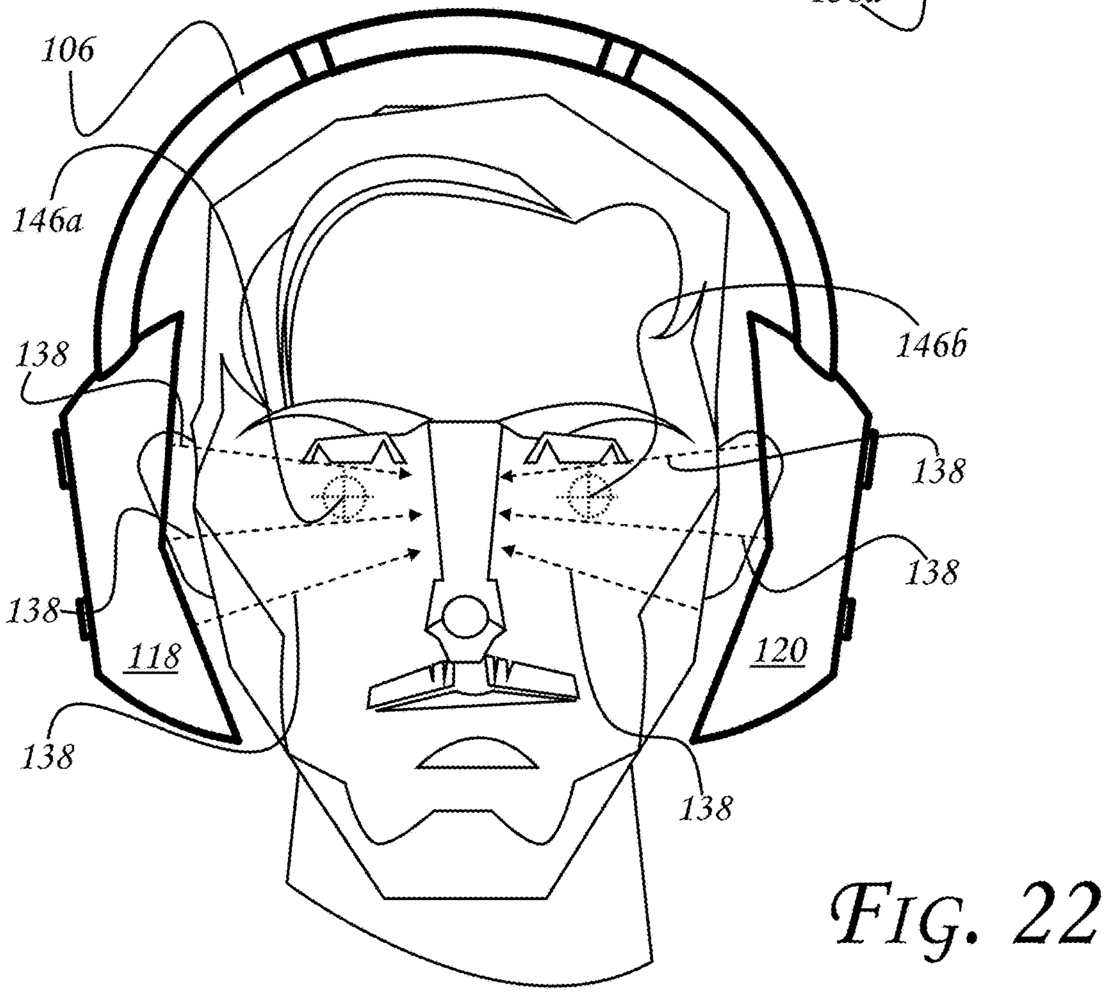
FIG. 22

SURROUND SOUND HEADPHONE DEVICE

RELATED APPLICATIONS

This application claims the benefit of U.S. provisional patent application No. 63/196,955 filed Jun. 4, 2021, the contents of which are incorporated by this reference in the entirety for all purposes as if fully set forth herein.

TECHNICAL FIELD

The disclosure herein relates generally to devices and methods for the reproduction of surround sound. More particularly, the disclosure relates to devices and methods to facilitate a user's perception that auditory signals are originating from real-world sources surrounding the user while the user is engaged with and using the surround sound headphones.

BACKGROUND

The use of surround sound has been established for many decades. For example only, commercial theaters, home theaters, and home gaming systems, all use surround sound loudspeakers to mimic the sounds of a real world environment through an entertainment media being played in any given moment.

Unfortunately, this requires that individuals be tethered to the specific geographic location where the surrounding auditory system is installed. What is needed is an individualized surround sound system that can mimic the same quality and effects of the larger dedicated systems currently in use in the home and commercial settings, but which only the user may enjoy.

SUMMARY

Certain deficiencies of the prior art are overcome by the provision of embodiments of an apparatus, kit, and system in accordance with the present disclosure. The aim of the summary is to facilitate understanding of the present disclosure. The summary thus presents concepts and features in looser terms than the detailed description below and should not be taken as limiting of other portions of the present disclosure.

Loosely speaking, herein described may be a surround sound headphone device which may comprise a first headphone assembly and a second headphone assembly. The first headphone assembly may have a first acoustic chamber surround and the second headphone assembly may have a second acoustic chamber surround. The first acoustic chamber surround and the second acoustic chamber surround may be connected therein by a headband assembly. The first headphone assembly and the second headphone assembly may each further have an acoustic chamber dividing partition, the acoustic chamber dividing partition may be enveloped by the first acoustic chamber surround and the second acoustic chamber surround.

The acoustic chamber dividing partition may subdivide the first headphone assembly and the second headphone assembly into one or more than one acoustic high frequency sub-chamber and one or more than one acoustic low frequency sub-chamber. The acoustic chamber dividing partition may further have a one or more than one low frequency high frequency port and a one or more than one high frequency high frequency port. The first acoustic chamber surround and the second acoustic chamber surround may further have a one or more than one high frequency external port and a one or more than one low frequency external port, said one or more than one high frequency external port may be disposed to the acoustic high frequency sub-chamber and said one or more than one low frequency external port being disposed to the acoustic low frequency sub-chamber. The low frequency high frequency port and high frequency high frequency port may be configured for the passage of air between said subdivided chambers, and the high frequency external port and the low frequency external port may be configured for the passage of air from said subdivided chambers to an external end of the first headphone assembly and the second headphone assembly.

The first headphone assembly and the second headphone assembly may further one or more than one or more than one high frequency auditory source and a one or more than one low frequency auditory source. The one or more than one high frequency auditory source and one or more than one low frequency auditory source may be configured for the production of an auditory pressure waves, said auditory pressure waves being capable of carrying a sound reproduction. The one or more than one high frequency auditory source may define a high frequency vector originating plane therein and the one or more than one low frequency auditory source may define a low frequency vector originating plane therein. The high frequency vector originating plane and said low frequency vector originating plane each may have a normal vector direction, said normal vector direction being directed to a center point of a user's head.

All of the aforementioned high frequency auditory source and low frequency auditory source may be configured to operate with an independent auditory signal such that each auditory source, high and low, may use a separate and distinct signal for auditory processing.

BRIEF DESCRIPTION OF THE DRAWINGS

The foregoing and other features of the present disclosure will become more fully apparent from the following description, taken in conjunction with the accompanying drawings. Understanding that these drawings depict only several embodiments in accordance with the disclosure and are not to be considered limiting of its scope, the disclosure will be described with additional specificity and detail through the use of accompanying drawings. Accordingly, further advantages of the present disclosure may become apparent to those skilled in the art with the benefit of the following detailed description of the preferred embodiments and upon reference to the accompanying drawings in which:

FIG. 1 is a perspective view of one non-limiting embodiment of a surround sound headphone device;

FIG. 2 is a transparent section view of one non-limiting embodiment of a first side and second side of a surround sound headphone;

FIG. 8 is a perspective view of one non-limiting embodiment of a surround sound headphone device;

FIG. 9 is a perspective view of one non-limiting embodiment of a surround sound headphone device;

FIG. 10 is an elevated perspective view of one non-limiting embodiment of a first surround sound headphone;

FIG. 11 is an elevated perspective view of one non-limiting embodiment of a second surround sound headphone;

FIG. 16 is a perspective transparent sectional highlighting non-limiting views of a normal vector direction of a surround sound headphone device;

FIG. 17 is a perspective transparent sectional highlighting one non-limiting view of localized auditory sources of a surround sound headphone device;

FIG. 21 is a side plan partial transparent section view of one non-limiting embodiment of a surround sound headphone device wherein vector directions are illustrated; and, FIG. 22 is an additional side plan view of one non-limiting embodiment of a surround sound headphone device wherein a user is illustrated as engaged with the surround sound headphones.

DETAILED DESCRIPTION

Figure 3:
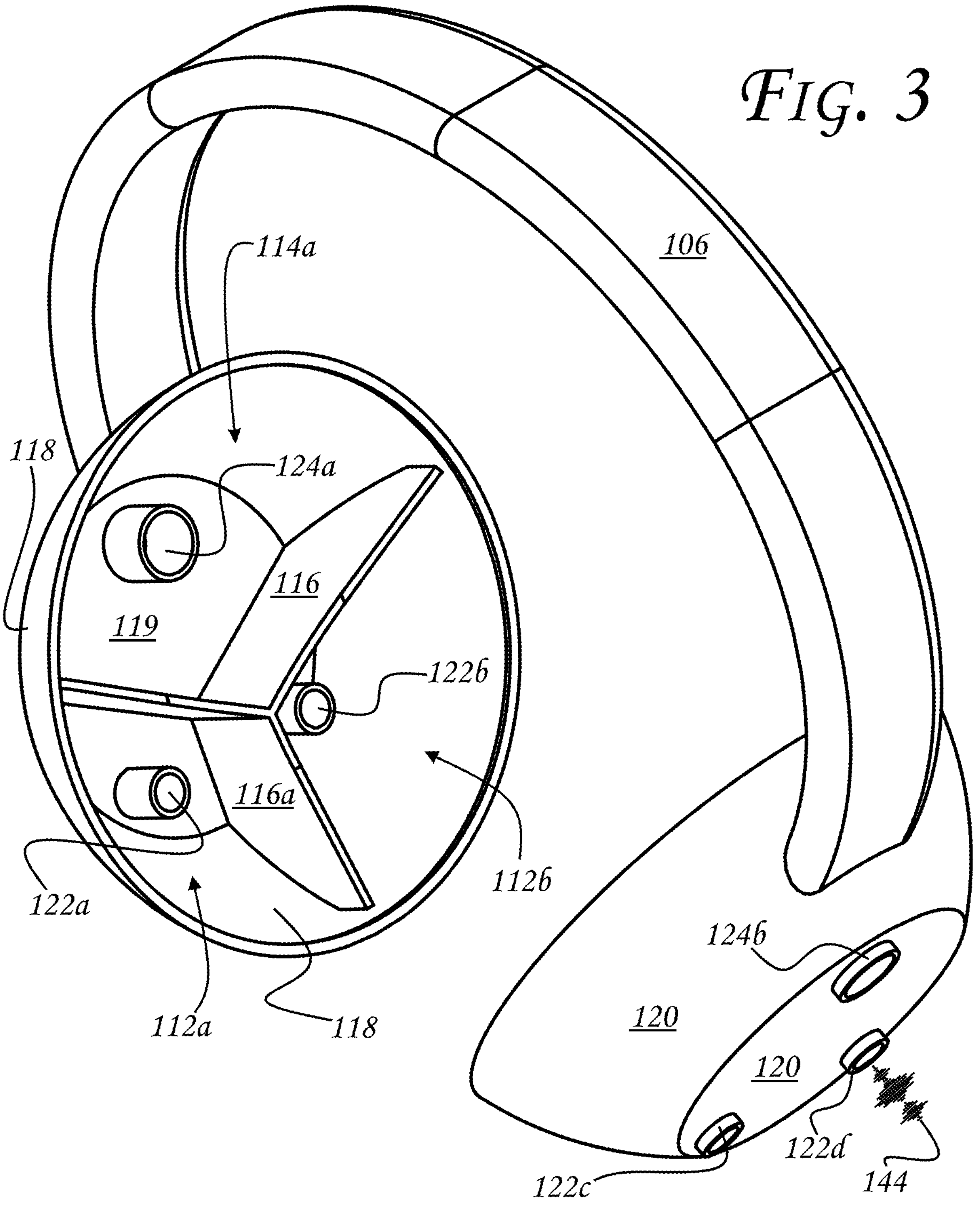
FIG. 3 is a perspective view of one non-limiting embodiment of a surround sound headphone device.

The various embodiments of the present disclosure, in terms of both structure and operation, will be best understood from the following detailed description, especially when considered in conjunction with the accompanying drawings. Before elucidating the embodiments shown in the FIGS., various embodiments of the present disclosure will first be described in general terms.

The present disclosure teaches a surround sound headphone. In the context of the present disclosure, a surround sound headphone may be understood as a system in which a user may be able to perceive sound as though the sound had origination points other than the actual origination point. The surround sound headphone may be spoken of in terms of one half of one headphone, or in terms of a pair; this is due to the mirrored aspect of headphones and common to headphone designs. There may be components which are not mirrored and these components will be apparent from the description of the component. The surround sound headphone may comprise an envelope for the containment of further components, including that of a dividing partition. The dividing partition may be used to sub-divide the envelope into more than one chamber which is independently capable of producing audio reproductions.

The surround sound headphone may comprise at least two sub-divided partitions from the dividing partition, therein defining two sub-chambers, one sub-chamber being low frequency. The surround sound headphone may comprise at least three sub-divided partitions from the dividing partition therein defining three sub-chambers, one sub-chamber being low frequency. The surround sound headphone may comprise at least four sub-divided partitions from the dividing partition therein defining four sub-chambers, at least one sub-chamber being low frequency. The surround sound headphone may comprise at least five sub-divided partitions from the dividing partition therein defining five sub-chambers, one sub-chamber being low frequency. The surround sound headphone may comprise at least three sub-divided partitions from the dividing partition therein defining three sub-chambers, two sub-chamber being low frequency. The surround sound headphone may comprise at least four sub-divided partitions from the dividing partition therein defining four sub-chambers, two sub-chamber being low frequency. The surround sound headphone may comprise at least five sub-divided partitions from the dividing partition therein defining five sub-chambers, with at least two sub-chambers being low frequency. The surround sound headphone may comprise any number of sub-divided partitions from the dividing partition therein defining any number of sub-chambers, with any number of sub-chambers being low frequency and any number being high frequency.

The surround sound headphone may comprise any number of high frequency external ports, as may be necessary to support the number of sub-chambers. The surround sound headphone may comprise any number of low frequency external ports as is necessary to support the number of sub-chambers. The surround sound headphone may comprise any number of high frequency low frequency ports as is necessary to support the number of sub-chambers. The surround sound headphone may comprise any number of high frequency high frequency ports as is necessary to support the number of sub-chambers. The surround sound headphone may comprise any number of high frequency auditory sources as is necessary to support the number of sub-chambers. The surround sound headphone may comprise any number of low frequency auditory sources as is necessary to support the number of sub-chambers. All of the aforementioned high frequency auditory source and low frequency auditory source may be configured to operate with an independent auditory signal such that each auditory source, high and low, may use a separate and distinct signal for auditory processing.

DESCRIPTION OF THE ILLUSTRATED EMBODIMENTS

Embodiments of systems, components, and methods of assembly and manufacture will now be described with reference to the accompanying figures. Although several embodiments, examples, and illustrations are disclosed below, it will be understood by those of ordinary skill in the art that the embodiments described herein extend beyond the specifically disclosed configurations, examples, and illustrations, and can include other users of the disclosure and obvious modifications and equivalents thereof. The terminology used in the descriptions presented herein is not intended to be interpreted in any limited or restrictive manner simply because it is being used in conjunction with a detailed description of certain specific embodiments of the disclosure. In addition, embodiments of the disclosure can comprise several novel features and no single feature is solely responsible for its desirable attributes or is essential to practicing any one of the several embodiments herein described.

Certain terminology may be used in the following description for the purpose of reference only, and thus are not intended to be limiting. For example, terms such as "above" and "below" refer to directions in the drawings to which reference is made. Terms such as "front," "back," "left," "right," "rear," "top," "bottom" and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specially mentioned above, derivatives thereof, and words of similar import.

Referring to the drawings, like reference numerals designate identical or corresponding features throughout the several views. Described herein are certain non-limiting embodiments of a surround sound headphone device 100 for use in the application and support of surround sound gaming, movie watching, and other features and functions therein.

Referring to FIG. 1, shown is one non-limiting embodiment of a surround sound headphone device 100 as described herein. The aforementioned surround sound headphone device 100 may be viewed in a fully assembled state in FIG. 1. The surround sound headphone device 100 is illustrated as having a one or more than one headphone assembly cushion 101 and a headband assembly 106. Speaking broadly, the surround sound headphone device 100 may be considered a whole from two halves. The two halves may include a first headphone assembly 102 and a second headphone assembly 104. Both halves may be constructed in an identical fashion, thus when discussing one half it may be assumed that said discussion may be applicable to both halves if not explicitly so stated. Where an aspect applies to only one half, such a distinction will likewise be pointed out.

Figure 4:
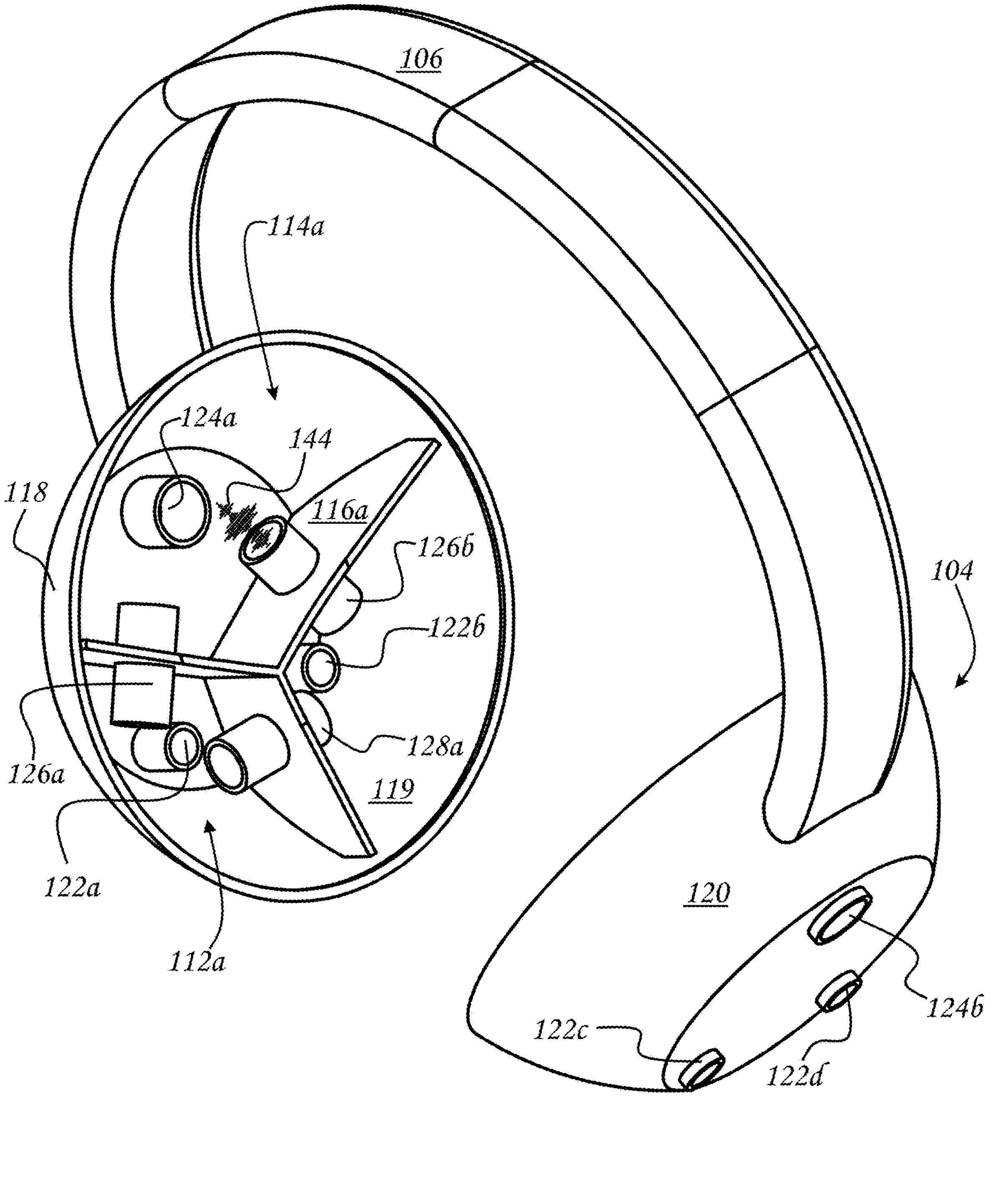
FIG. 4 is a perspective view of one non-limiting embodiment of a surround sound headphone device.

Referring to FIGS. 2-4, illustrated is a partial and transparent internal views. Shown are a first acoustic chamber assembly 108 and a second acoustic chamber assembly 110. Further shown is a first acoustic chamber surround 118 and a second acoustic chamber surround 120. The first acoustic chamber surround 118 may have an first acoustic chamber surround internal portion 119 and the second acoustic chamber surround 120 may have a second acoustic chamber surround internal portion 121. Located adjacent to the first acoustic chamber surround internal portion 119 and the second acoustic chamber surround internal portion 121 may be an acoustic chamber dividing partition 116. Said acoustic chamber dividing partition 116 may be associated with the first acoustic chamber assembly 108 and the second acoustic chamber assembly 110. Said acoustic chamber dividing partition 116 may divide the first acoustic chamber assembly 108 and the second acoustic chamber assembly 110 into one or more than one sub-chambers, wherein said sub-chambers may be categorized as an acoustic high frequency sub-chamber 112 and an acoustic low frequency sub-chamber 114. Said acoustic chamber dividing partition 116 may sub-divide a given acoustic chamber into as many acoustic high frequency sub-chamber 112 and as many acoustic low frequency sub-chamber 114 as may be deemed desired and or necessary to achieve a given surround sound effect. For example and illustration only, seen here are two acoustic high frequency sub-chamber 112 and one acoustic low frequency sub-chamber 114.

Still referring to FIGS. 2-4, correspondingly with the acoustic high frequency sub-chamber 112 are a high frequency external port 122 and correspondingly with the acoustic low frequency sub-chamber 114, are a low frequency external port 124. Said high frequency external port 122 and low frequency external port 124 may provide space for areas of local high ambient air pressure and local low ambient air pressure to come to a balanced localized air pressure. Further, said high frequency external port 122 and low frequency external port 124 may pass through the first acoustic chamber surround 118 and second acoustic chamber surround 120 such that internal air pressure built up in the previously mentioned first acoustic chamber assembly 108 and second acoustic chamber assembly 110 to port externally to the surround sound headphone device 100. Local high pressure and local low pressure in this context may refer to auditory pressure waves 144 as seen, by way of example only, in FIG. 4.

Referring to FIG. 4, seen are additional ports as passing through the acoustic chamber dividing partition 116. Said ports may be one of two types as described herein, a low frequency high frequency port 126 or a high frequency high frequency port 128. Said low frequency high frequency port 126 may permit the passage of air and auditory pressure waves 144 to pass between the acoustic low frequency sub-chamber 114 to the acoustic high frequency sub-chamber 112. Said high frequency high frequency port 128 may permit the passage of air and auditory pressure waves 144 to pass between an acoustic high frequency sub-chamber 112 and another acoustic high frequency sub-chamber 112. All of said ports; the high frequency external port 122, the low frequency external port 124, the low frequency high frequency port 126, and the high frequency high frequency port 128 may be considered as passage through for areas of localized high air pressure to normalize with areas of localized low air pressure.

Figure 5:
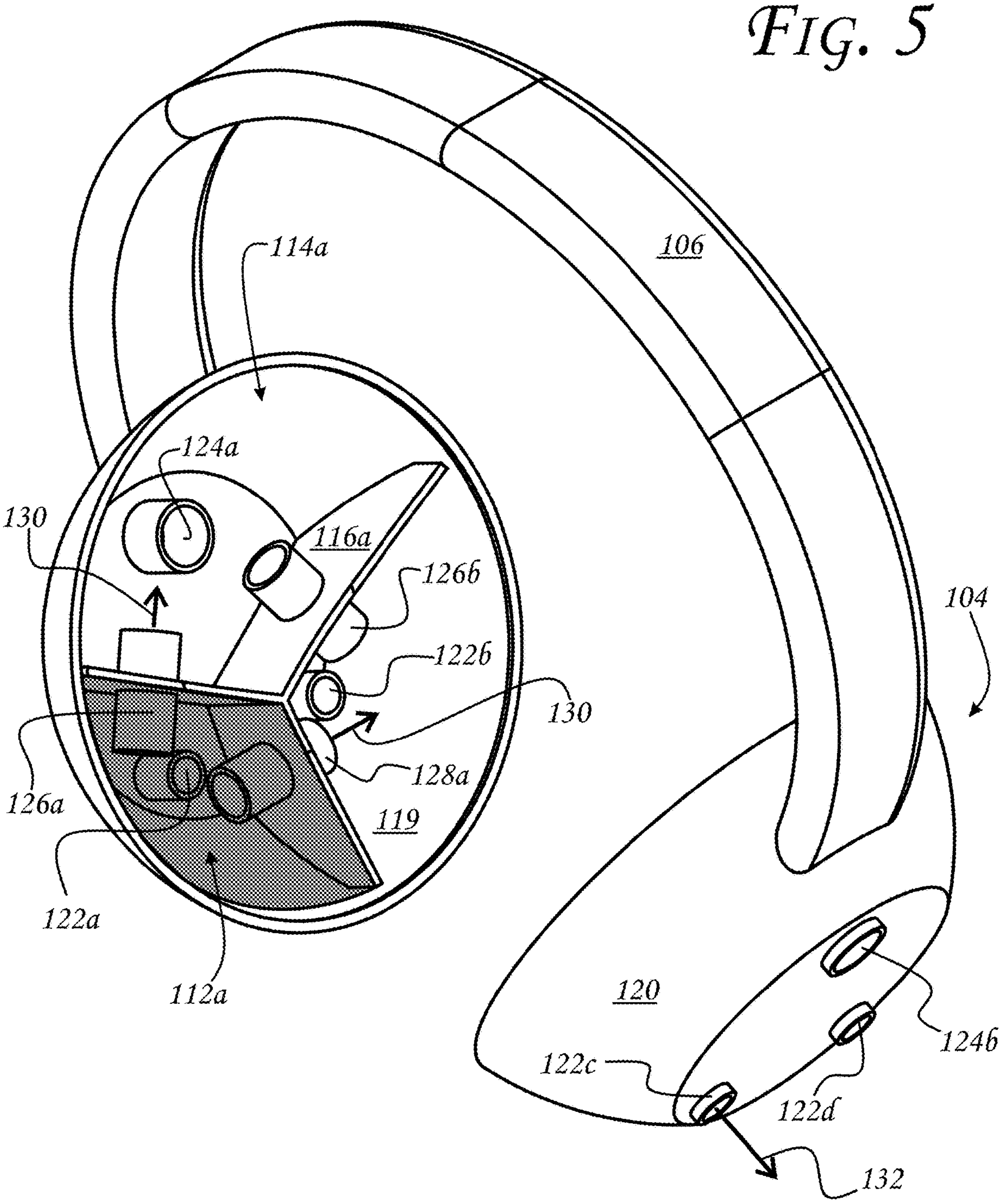
FIG. 5 is a perspective view of one non-limiting embodiment of a surround sound headphone device.
Figure 6:
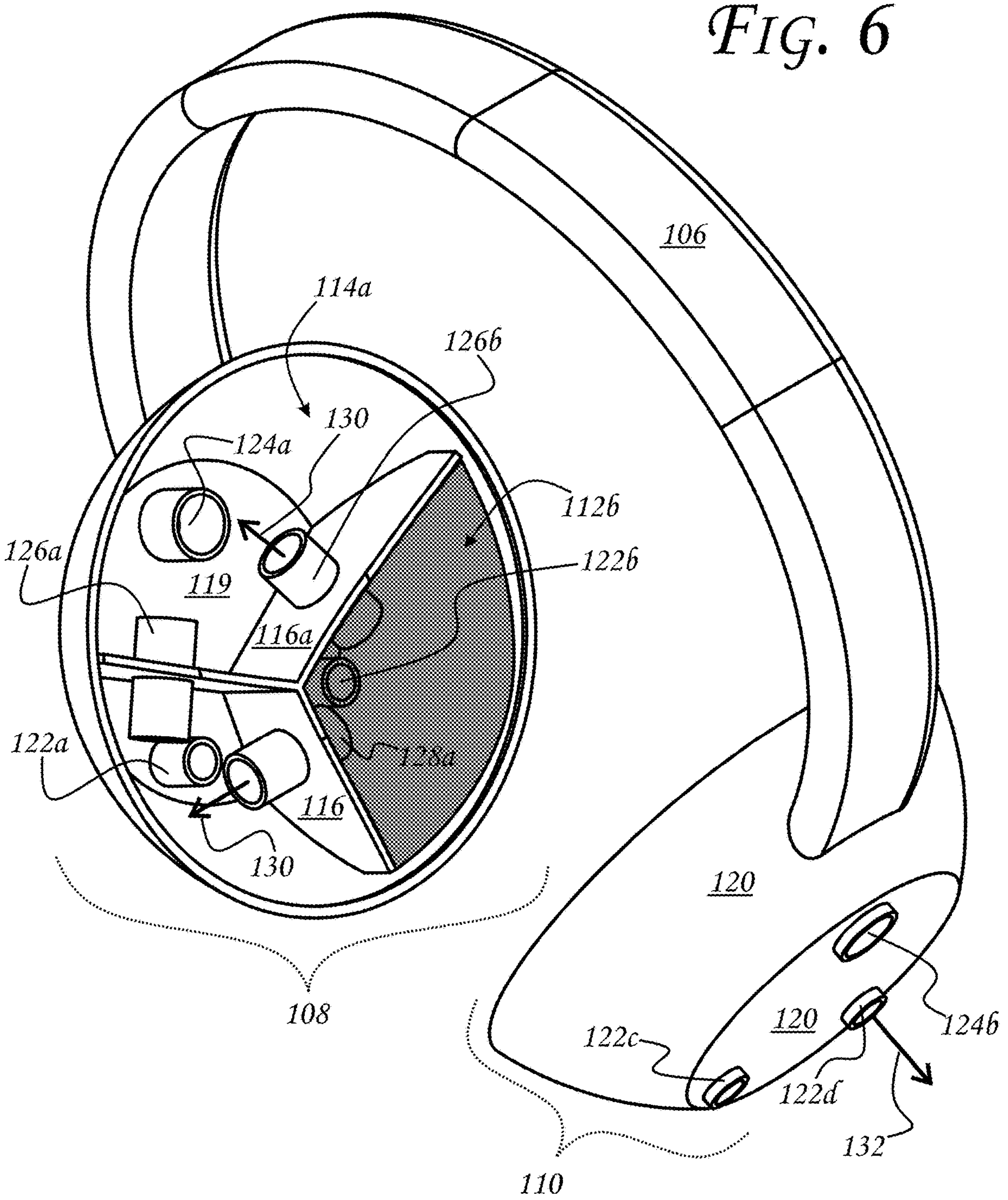
FIG. 6 is a perspective view of one non-limiting embodiment of a surround sound headphone device.
Figure 7:
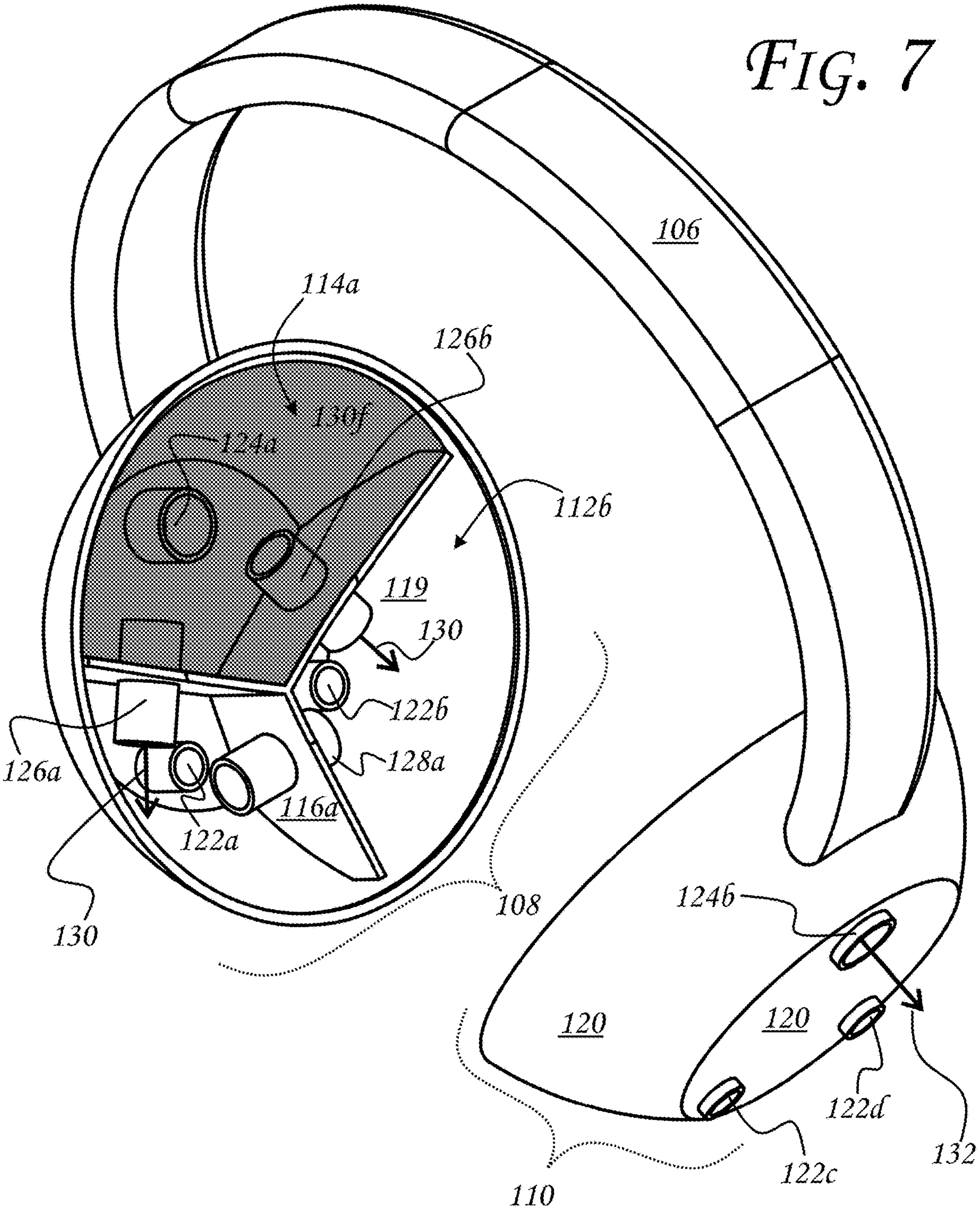
FIG. 7 is a perspective view of one non-limiting embodiment of a surround sound headphone device.
Figure 12:
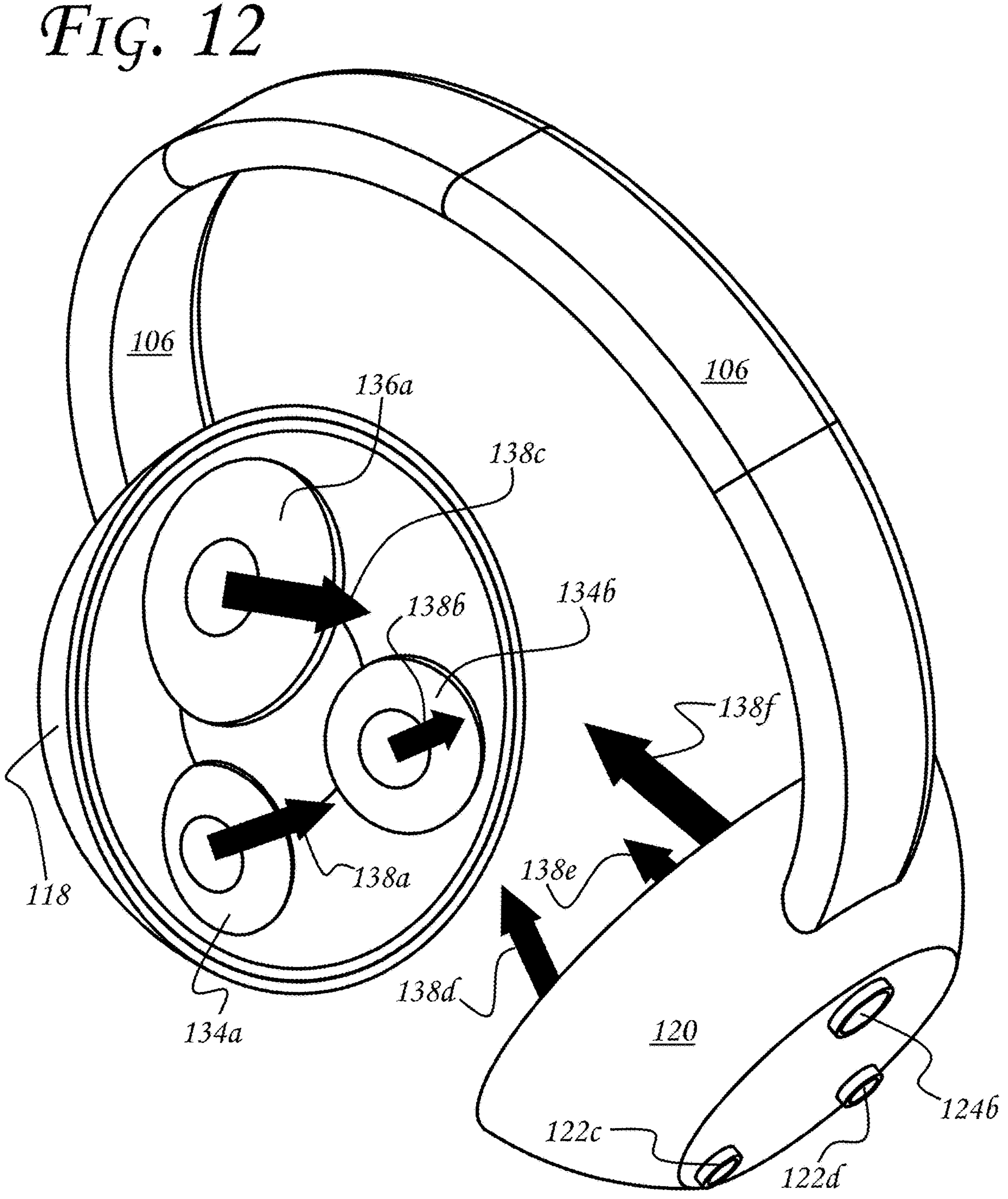
FIG. 12 is a perspective view of one non-limiting embodiment of a surround sound headphone device.
Figure 13:
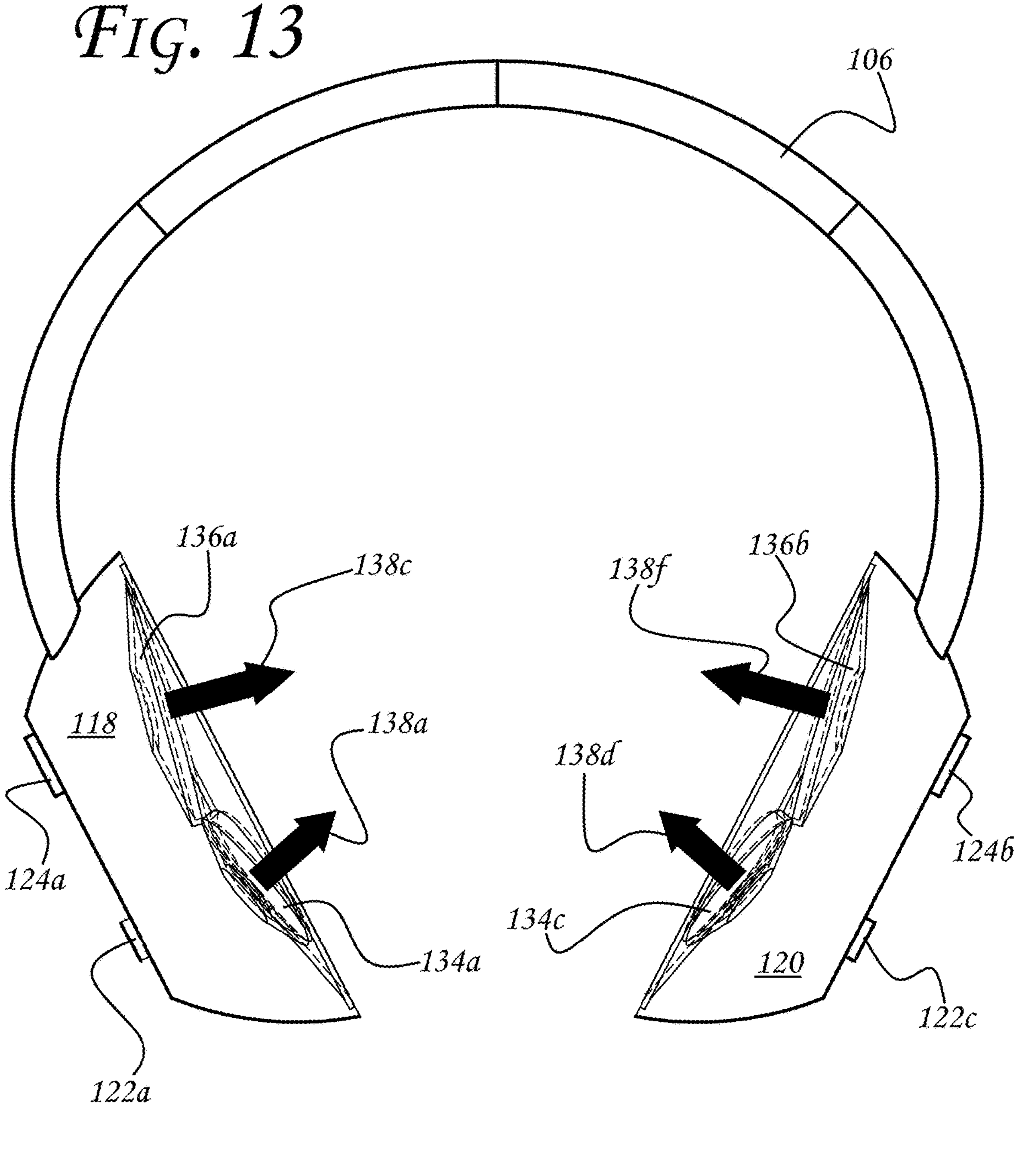
FIG. 13 is a side plan transparent section view of one non-limiting embodiment of a surround sound headphone device.
Figure 14:
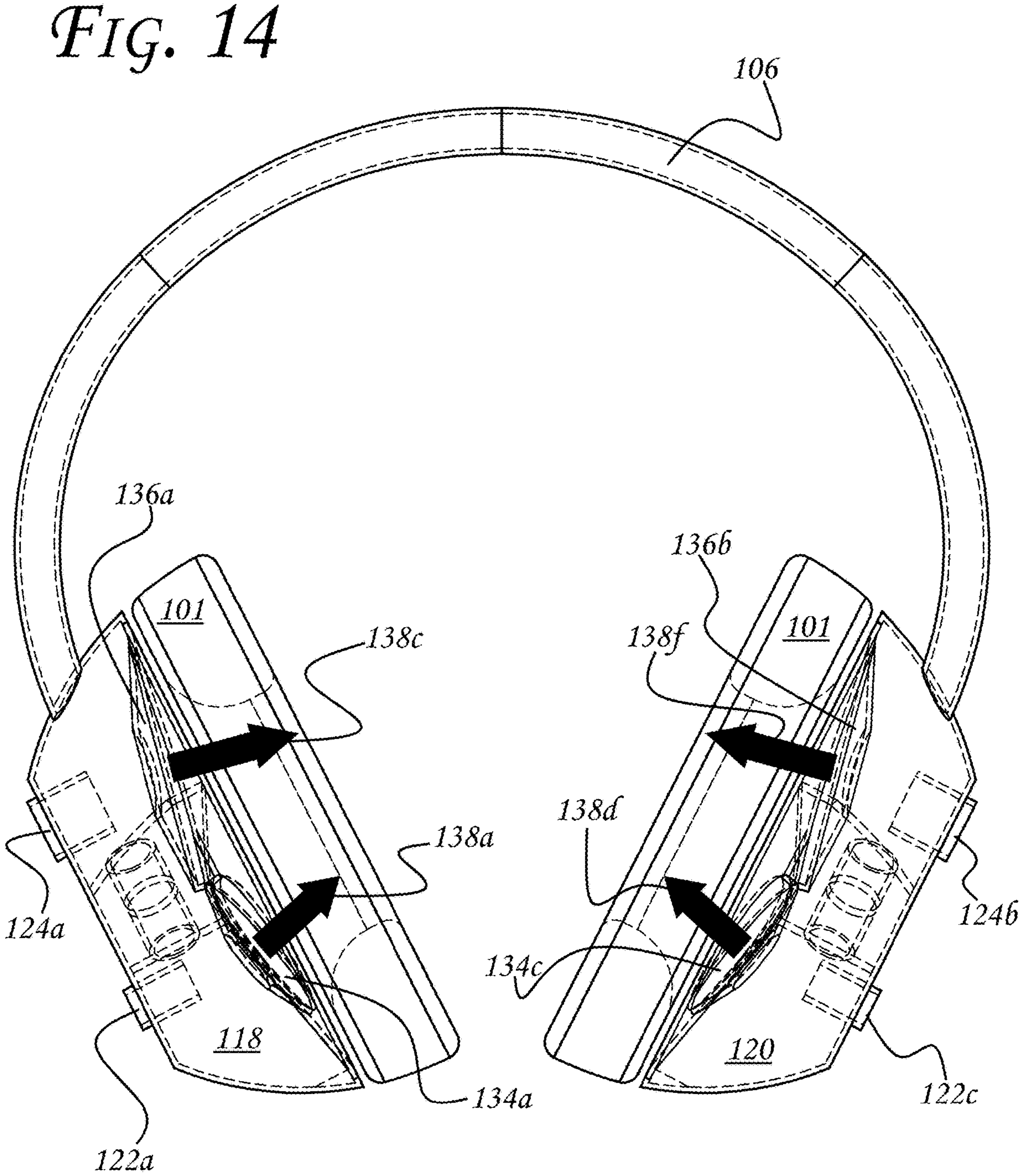
FIG. 14 is a side plan transparent section view of one non-limiting embodiment of a fully assembled surround sound headphone device.
Figure 15:
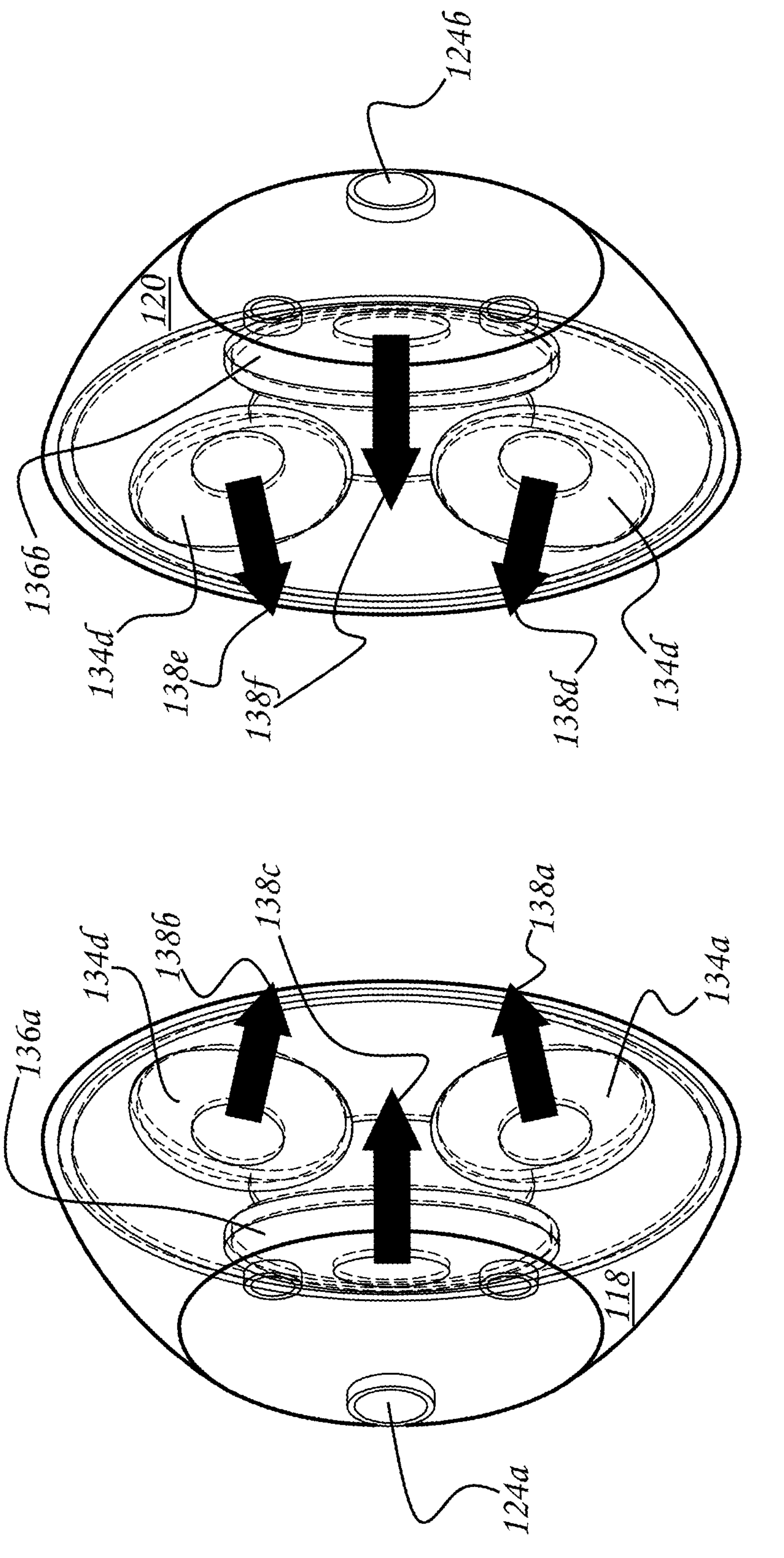
FIG. 15 is an elevated perspective view of one non-limiting embodiment of a surround sound headphone device.

Referring now to FIGS. 5-7, seen is a representation of the internal passage of an internal pressure wave propagation direction 130. Seen is the internal pressure wave propagation direction 130 and thus, path, from one sub-chamber to another. The darker shading of any given sub-chamber is to represent the respective auditory source (being either a high frequency auditory source 134 or low frequency auditory source 136 as shown and discussed as follows). When any one given sub-chamber is producing sound (discussed below), whether it is the one or more than one acoustic high frequency sub-chamber 112 or the one or more than one acoustic low frequency sub-chamber 114, the internal passage of pressure wave propagations may occur. This may be to relieve built up air pressure which may be residual and co-incident with the production of sound. As can be seen in FIG. 5, the internal pressure wave propagation direction 130 from the one or more than one acoustic high frequency sub-chamber 112 may be to another acoustic high frequency sub-chamber 112 and to the acoustic low frequency sub-chamber 114. As can be seen in FIG. 6, the internal pressure wave propagation direction 130 from the one or more than one acoustic high frequency sub-chamber 112 may be to another acoustic high frequency sub-chamber 112 and to the acoustic low frequency sub-chamber 114. As can be seen in FIG. 7 for example only, the internal pressure wave propagation direction 130 from the one or more than one acoustic low frequency sub-chamber 114 may be to two or more acoustic high frequency sub-chamber 112, or in other embodiments, to one or more than one acoustic high frequency sub-chamber 112 and one or more than one acoustic low frequency sub-chamber 114. Of the aforementioned high frequency auditory source 134 and the aforementioned low frequency auditory source 136, each may be configured to operate with an independent auditory signal such that each auditory source, high and low, may use a separate and distinct signal for auditory processing. Said signal may be different between two different auditory sources. Thus if there are a plurality of auditory sources in a single headphone assembly, the plurality of auditory sources would correspond to a plurality of auditory signals, each signal being independently directed to a specific auditory source.

Still referring to FIGS. 5-7, seen is further representation of the external passage of external pressure wave propagation direction 132. Herein may be an example of two adjacent sub-chambers (either the acoustic high frequency sub-chamber 112 or the acoustic low frequency sub-chamber 114, two acoustic high frequency sub-chamber 112, or two acoustic low frequency sub-chamber 114) being in air pressure communication. When any one given sub-chamber is producing sound (discussed below), whether it is the one or more than one acoustic high frequency sub-chamber 112 or the one or more than one acoustic low frequency sub-chamber 114, the external passage of pressure wave propagations may occur similarly to as described above with the discussion of the internal passage of the internal pressure wave propagation direction 130. Such air pressure waves require Here seen is the internal relief, towards the exterior of the surround sound headphone device 100, of any built up air pressure which may be residual and co-incident with the production of sound. As can be seen in FIG. 5, the external pressure wave propagation direction 132 from the one or more than one acoustic high frequency sub-chamber 112 may be passed from the interior of the surround sound headphone device 100 to the exterior of the surround sound headphone device 100 via the corresponding high frequency external port 122. As can be seen in FIG. 6, the external pressure wave propagation direction 132 from the one or more than one acoustic high frequency sub-chamber 112 may be passed from the interior of the surround sound headphone device 100 to the exterior of the surround sound headphone device 100 via the corresponding high frequency external port 122. As can be seen in FIG. 7, the external pressure wave propagation direction 132 from the one or more than one acoustic low frequency sub-chamber 114 may be to the exterior of the surround sound headphone device 100 via the corresponding low frequency external port 124.

Referring now to FIGS. 8-17, seen are a one or more than one high frequency auditory source 134 and a one or more than one low frequency auditory source 136. Each auditory source, the low frequency auditory source 136 and the high frequency auditory source 134, may produce auditory pressure waves 144 as previously mentioned. Said auditory pressure waves 144, in combination with the high frequency external port 122 (as seen, for example only in FIGS. 2-7), the low frequency external port 124 (as seen, for example only in FIGS. 2-7), the low frequency high frequency port 126 (as seen, for example only in FIGS. 2-7), and the high frequency high frequency port 128 (as seen, for example only in FIGS. 2-7), may produce the aforementioned internal pressure wave propagation direction 130 (as seen, for example only in FIGS. 5-7) as well. Thus, as any auditory generation from the high frequency auditory source 134 or the low frequency auditory source 136 may additionally form the auditory pressure waves 144. The said auditory pressure waves 144 may then be dispersed via the aforementioned ports (the high frequency external port 122, the low frequency external port 124, the low frequency high frequency port 126, and the high frequency high frequency port 128). The low frequency auditory source 134 of the first headphone assembly 102 may receive auditory processing signals specific to the first headphone assembly 102. The low frequency auditory source 134 of the second headphone assembly 104 may receive auditory processing signals specific to the first headphone assembly 104.

Herein the term auditory source may be defined as an object which is capable of reproducing sound, said auditory source may be further defined by a forward face, by which the reproduced sound is projected. Thus, the auditory source will have a forward direction based on the projection of sound. The term vector originating plane may be defined as a plane that has an average value of an angle approximately 180 degrees to the forward face of the auditory source. In other words, the forward face of the auditory source may produce a plane which may be visualized as being projected across and perpendicular to the forward face of the auditory source. The term normal vector direction may be defined herein by its typical use in mathematics. Thus, this normal vector may be defined as originating at an approximate 180 degree projection from the vector originating plane. The terms high frequency and low frequency are relative terms, and are only relative to each other; meaning that a high frequency is higher than a lower frequency, and a low frequency is lower than a high frequency; the terms high frequency and low frequency should not be confused for ranges, i.e.; high frequency range, mid-frequency range, or low frequency range. All of the high frequency auditory source 134 and low frequency auditory source 136 may be configured to operate with an independent auditory signal such that each auditory source, high and low, may use a separate and distinct signal for auditory processing.

Referring now to FIGS. 12-22, the aforementioned one or more than one high frequency auditory source 134 may be conceptually understood as a high frequency vector originating plane 140 and the low frequency auditory source 136 may be conceptually understood as a low frequency vector originating plane 142. The high frequency vector originating plane 140 and the low frequency vector originating plane 142 may result in the seen normal vector direction 138. Referring to FIGS. 12-17, seen are various high frequency auditory source 134 and low frequency auditory source 136 as those auditory sources relate to the normal vector directions 138. As can be observed through the various FIGS. 12-22, as the angle of the first 102 and the second headphone assembly 104 changes relative to a user, the normal vector direction 138 will change. The normal vector direction 138 as indicated in FIG. 22 shows that the vector direction is aimed beyond a user's ears and to the center of a user's head. Such aiming mimics the natural environment much better, as sound produced in the natural environment is not aimed at a listener's ears, rather sound is perceived as a wave passing through a user's head. As can be seen in FIG. 22, focal point 146 is beyond the center line of a user's head but does not extend beyond the opposite ear of a listener.

Figure 18:
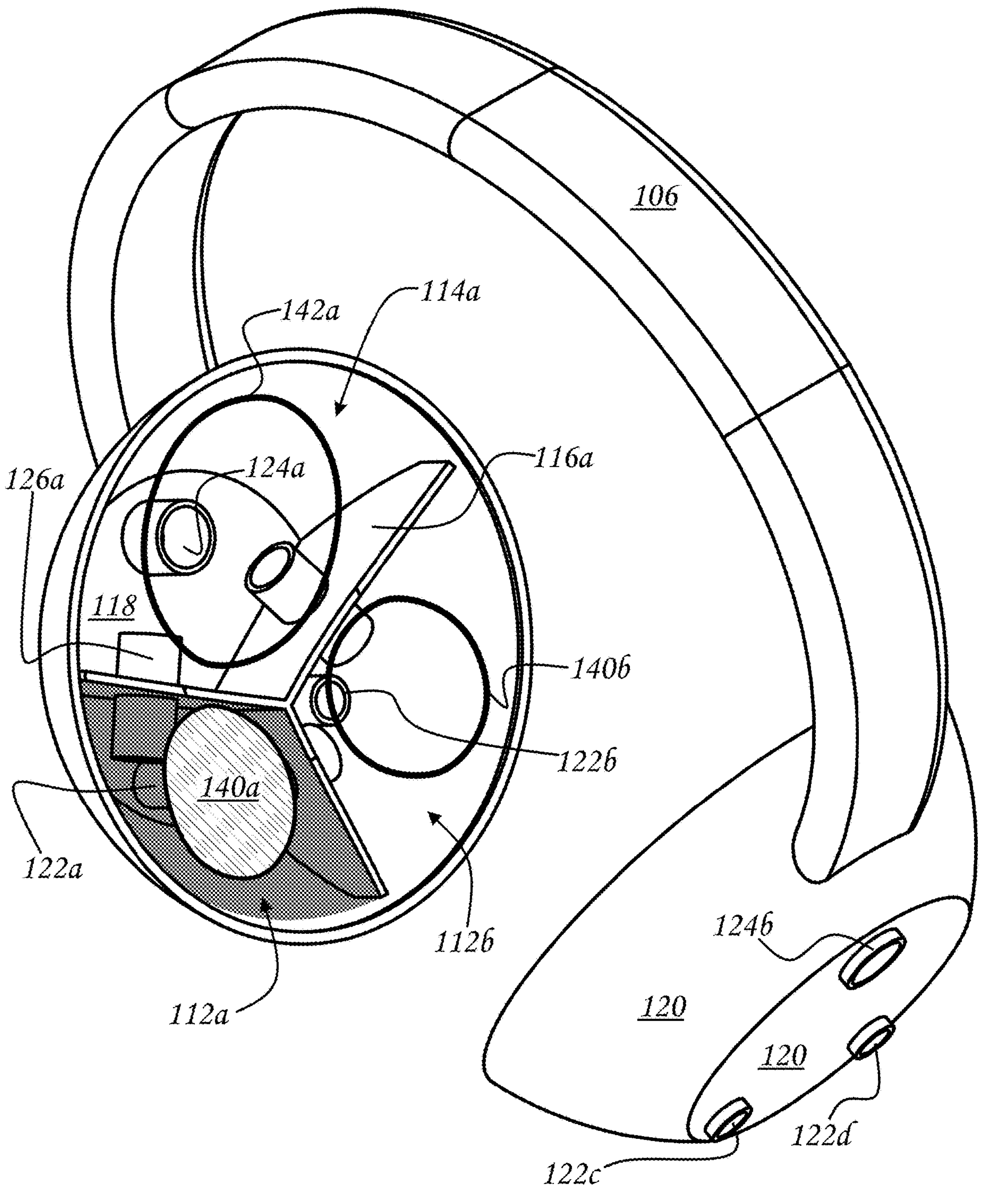
FIG. 18 is a perspective view of one non-limiting embodiment of a surround sound headphone device.
Figure 19:
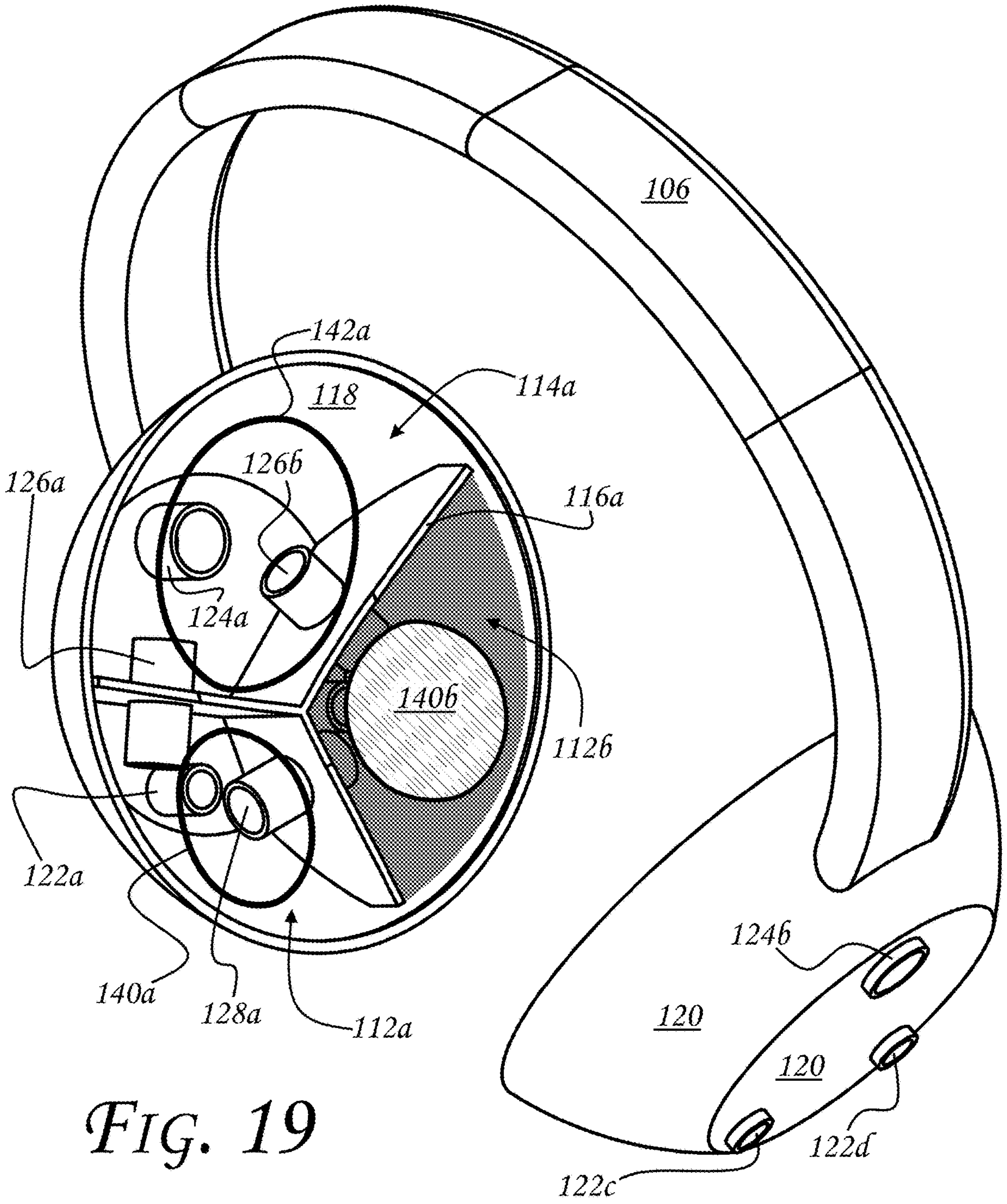
FIG. 19 is a perspective view of one non-limiting embodiment of a surround sound headphone device.
Figure 20:
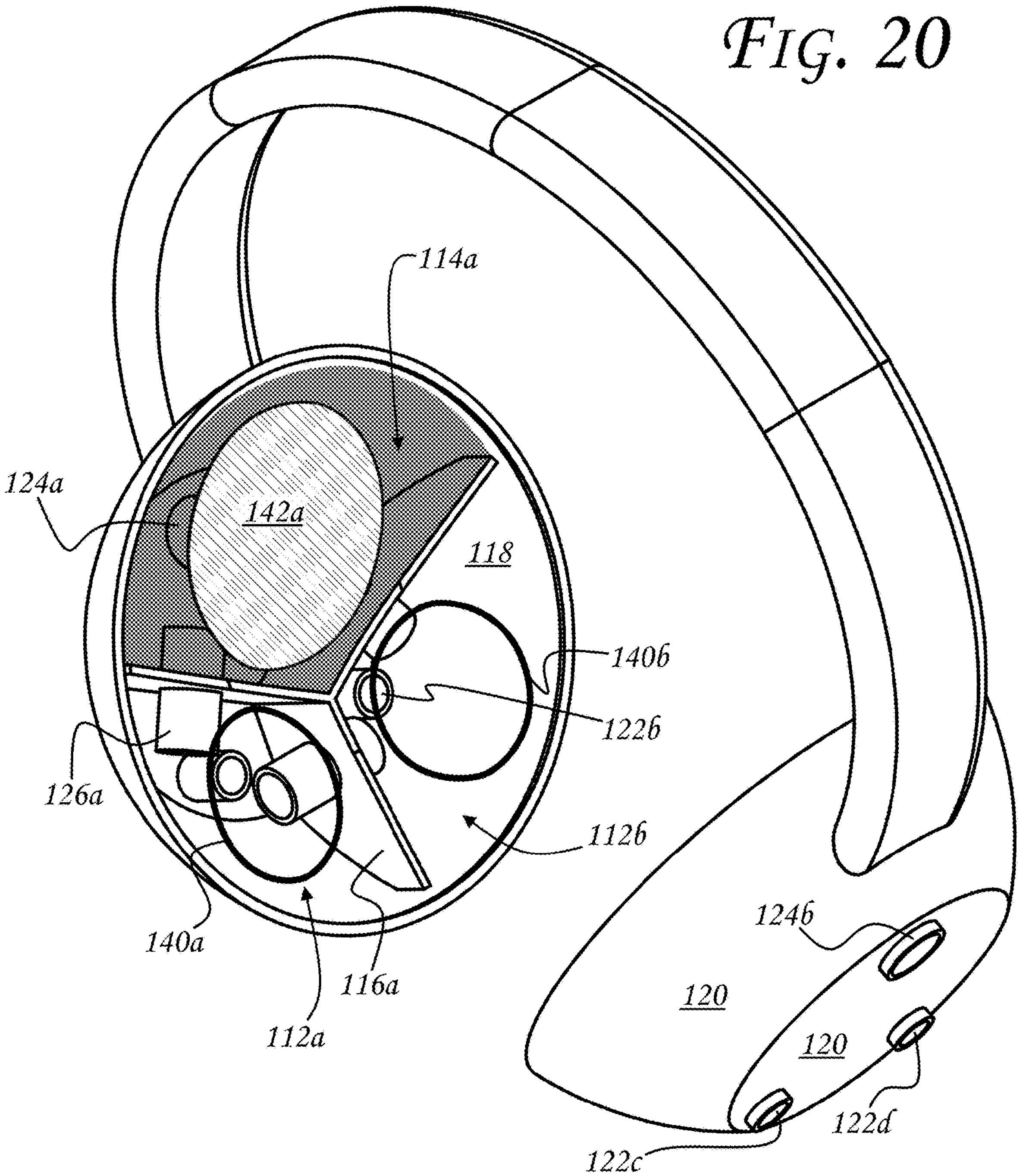
FIG. 20 is a perspective view of one non-limiting embodiment of a surround sound headphone device.

Referring to FIGS. 18-20, the one or more than one high frequency vector originating plane 140 and the one or more than one low frequency vector originating plane 142 may be illustrated for better conceptual understanding. Here, the locations of the auditory sources have been replaced with corresponding visualizations of the one or more than one high frequency vector originating plane 140 and the one or more than one low frequency vector originating plane 142. It should be understood that the high frequency vector originating plane 140 and the low frequency vector originating plane 142 are symbolically represented here and do not represent physical objects. Rather, the high frequency vector originating plane 140 and the low frequency vector originating plane 142 are defined by the placement of a respective high frequency auditory source 134 and a low frequency auditory source 136 and exist only relative to said auditory sources.

Using the visual representation of the high frequency vector originating plane 140 and the low frequency vector originating plane 142 of FIGS. 18-20, further elaboration may provide a clearer understanding of the aiming of the normal vector direction 138 as being presented through FIGS. 21-22. As previously stated, the normal vector direction 138 as indicated in FIG. 22 shows that the vector direction is aimed beyond a user's ears and to a focal point 146 beyond an imaginary vertical centerline of a user's head. Further, a comparison between FIGS. 21 and 22 may aid in visualizing this understanding, as the normal vector direction 138 changes as the relative positions of the first headphone assembly 102 and the second headphone assembly 104 are changed respective to a user's head. Thus, the normal vector direction 138 of one headphone assembly (both the first acoustic chamber assembly 108 and the second acoustic chamber assembly 110) may all converge on the same focal point 146 with each half of the surround sound headphone device 100 acting as a unit. The dotted line normal vector direction 138 as indicated in FIG. 21-22 is the same as the short solid line of previous figures, represented as extended out, such differences are established for clarity only. Each of the normal vector direction 138 converges on the focal point 146. Because there are two halves to the surround sound headphone device 100, there may be two focal point 146. The focal point 146 of the auditory sources (both the high frequency auditory source 134 and low frequency auditory source 136) converge as shown. The focal point 146 from the first headphone assembly 102 may be closer to the second acoustic chamber assembly 110 than to the first headphone assembly 102. The focal point 146 of the second headphone assembly 104 may be closer to the first headphone assembly 102 than to the second headphone assembly 104.

Having disclosed the structure of the preferred embodiments, it is now possible to describe its function, operation, and use.

For clarity, a full aspects/components list as represented in the figures is herein included, each reference character is of the format of three Arabic Numerals and if necessary, followed by a letter of the Greek alphabet:

100—surround sound headphone device
101—headphone assembly cushion
102—first headphone assembly
104—second headphone assembly
106—headband assembly
108—first acoustic chamber assembly
110—second acoustic chamber assembly
112*a*—acoustic high frequency sub-chamber
112*b*—acoustic high frequency sub-chamber
112*c*—acoustic high frequency sub-chamber
112*d*—acoustic high frequency sub-chamber
114*a*—acoustic low frequency sub-chamber
114*b*—acoustic low frequency sub-chamber
116*a*—acoustic chamber dividing partition
116*b*—acoustic chamber dividing partition
118—first acoustic chamber surround
119—first acoustic chamber surround internal portion
120—second acoustic chamber surround
121—second acoustic chamber surround internal portion
122*a*—high frequency external port
122*b*—high frequency external port
122*c*—high frequency external port
122*d*—high frequency external port
124*a*—low frequency external port
124*b*—low frequency external port
126*a*—low frequency high frequency port
126*a*—low frequency high frequency port
128*a*—high frequency high frequency port
128*b*—high frequency high frequency port
130—internal pressure wave propagation direction
132—external pressure wave propagation direction
134*a*—high frequency auditory source
134*b*—high frequency auditory source
134*c*—high frequency auditory source
134*d*—high frequency auditory source
136*a*—low frequency auditory source
136*b*—low frequency auditory source
138*a*—normal vector direction
138*b*—normal vector direction
138*c*—normal vector direction
138*d*—normal vector direction
138*e*—normal vector direction
138*f*—normal vector direction
140*a*—high frequency vector originating plane
140*b*—high frequency vector originating plane
140*c*—high frequency vector originating plane
140*d*—high frequency vector originating plane
142*a*—low frequency vector originating plane
142*b*—low frequency vector originating plane
144—auditory pressure waves
146*a*—focal point
146*b*—focal point Herein described may be an embodiment of a surround sound headphone device 100 which may comprise a first headphone assembly 102 and a second headphone assembly 104. The first headphone assembly 102 may have a first acoustic chamber surround 118 and the second headphone assembly 104 may have a second acoustic chamber surround 120. The first acoustic chamber surround 118 and the second acoustic chamber surround 120 may be connected therein by a headband assembly 106. The first headphone assembly 102 and the second headphone assembly 104 may each further have an acoustic chamber dividing partition 116, the acoustic chamber dividing partition 116 may be enveloped by the first acoustic chamber surround 118 and the second acoustic chamber surround 120. The acoustic chamber dividing partition 116 may subdivide the first headphone assembly 102 and the second headphone assembly 104 into one or more than one acoustic high frequency sub-chamber 112 and one or more than one acoustic low frequency sub-chamber 114. The acoustic chamber dividing partition 116 may further have a one or more than one low frequency high frequency port 126 and a one or more than one high frequency high frequency port 128. The first acoustic chamber surround 118 and the second acoustic chamber surround 120 may further have a one or more than one high frequency external port 122 and a one or more than one low frequency external port 124, said one or more than one high frequency external port 122 may be disposed to the acoustic high frequency sub-chamber 112 and said one or more than one low frequency external port 124 being disposed to the acoustic low frequency sub-chamber 114. The low frequency high frequency port 126 and high frequency high frequency port 128 may be configured for the passage of air between said subdivided chambers, and the high frequency external port 122 and the low frequency external port 124 may be configured for the passage of air from said subdivided chambers to an external end of the first headphone assembly 102 and the second headphone assembly 104. Said passage of air may result from the formation of a high pressure area due to the use of an auditory source (including either the high frequency auditory source 134 or the low frequency auditory source 136 as herein described). The first headphone assembly 102 and the second headphone assembly 104 may further have one or more than one or more than one high frequency auditory source 134 and a one or more than one low frequency auditory source 136. The one or more than one high frequency auditory source 134 and one or more than one low frequency auditory source 136 may be configured for the production of an auditory pressure waves 144, said auditory pressure waves 144 being capable of carrying a sound reproduction. The one or more than one high frequency auditory source 134 may define a high frequency vector originating plane 140 therein and the one or more than one low frequency auditory source 136 may define a low frequency vector originating plane 142 therein. The high frequency vector originating plane 140 and said low frequency vector originating plane 142 each may have a normal vector direction 138, said normal vector direction 138 being directed to a center point of a users head.

Herein described may be an embodiment of a surround sound headphone device 100 for the production of surround sound which may comprise a first headphone assembly 102 which may have a first acoustic chamber surround 118, the first acoustic chamber surround 118 may envelope a first acoustic chamber assembly 108. The first acoustic chamber assembly 108 may further have (a) an acoustic chamber dividing partition 116, (b) a one or more than one high frequency external port 122, (c) a low frequency external port 124, (d) a one or more than one low frequency high frequency port 126, (e) a high frequency high frequency port 128, (f) a one or more than one high frequency auditory source 134 and, (g) a low frequency auditory source 136. The acoustic chamber dividing partition 116 may act in partitioning the first acoustic chamber surround 118 into a one or more than one acoustic high frequency sub-chamber 112 and an acoustic low frequency sub-chamber 114. The low frequency auditory source 136 may be positioned in the acoustic low frequency sub-chamber 114 and the one or more than one high frequency auditory source 134 may be positioned such that each acoustic high frequency sub-chamber 112 has at least one high frequency auditory source 134. The low frequency auditory source 136 and the high frequency auditory source 134 may produce an auditory pressure waves 144. The one or more than one high frequency external port 122 and the low frequency external port 124 may be disposed to the first acoustic chamber surround 118. The one or more than one high frequency external port 122 may align with said one or more than one acoustic high frequency sub-chamber 112 and said low frequency external port 124 aligning with said acoustic low frequency sub-chamber 114. The low frequency high frequency port 126 and the high frequency high frequency port 128 may be disposed to the acoustic chamber dividing partition 116. Said low frequency high frequency port 126 may align with at least one said acoustic high frequency sub-chamber 112 and said acoustic low frequency sub-chamber 114 and the high frequency high frequency port 128 may be aligned between at least two acoustic high frequency sub-chamber 112. All of said one or more than one high frequency external port 122, said low frequency external port 124, said one or more than one low frequency high frequency port 126 and said high frequency high frequency port 128 may provide for the unabated passage of said one or more than one auditory pressure waves 144. Each of said high frequency auditory source 134 may therein define a high frequency vector originating plane 140 and said low frequency auditory source 136 may therein define a low frequency vector originating plane 142. Said high frequency vector originating plane 140 and low frequency vector originating plane 142 may be producing a normal vector direction, said normal vector direction being directed to the center of a user's head.

Herein described may be an embodiment of a surround sound headphone device 100 for the production of surround sound which may comprise a first headphone assembly 102 and which may have a first acoustic chamber surround 118. The first acoustic chamber assembly 108 may further have an acoustic chamber dividing partition 116. The acoustic chamber dividing partition 116 may result in sub-dividing the first acoustic chamber surround 118 into three distinct sub-chambers, at least one being acoustic low frequency sub-chamber 114.

Herein described may be an embodiment of a surround sound headphone device 100 for the production of surround sound which may comprise a first headphone assembly 102 and which may have a first acoustic chamber surround 118. The first acoustic chamber assembly 108 may further have an acoustic chamber dividing partition 116. The acoustic chamber dividing partition 116 may result in sub-dividing the first acoustic chamber surround 118 into three distinct sub-chambers, at least one being acoustic low frequency sub-chamber 114.

Herein described may be an embodiment of a surround sound headphone device 100 for the production of surround sound which may comprise a first headphone assembly 102 and which may have a first acoustic chamber surround 118. The first acoustic chamber assembly 108 may further have an acoustic chamber dividing partition 116. The acoustic chamber dividing partition 116 may result in sub-dividing the first acoustic chamber surround 118 into four distinct sub-chambers, at least one being acoustic low frequency sub-chamber 114.

Herein described may be an embodiment of a surround sound headphone device 100 for the production of surround sound which may comprise a first headphone assembly 102 and which may have a first acoustic chamber surround 118. The first acoustic chamber assembly 108 may further have an acoustic chamber dividing partition 116. The acoustic chamber dividing partition 116 may result in sub-dividing the first acoustic chamber surround 118 into five distinct sub-chambers, at least one being acoustic low frequency sub-chamber 114.

Herein described may be an embodiment of a surround sound headphone device 100 for the production of surround sound which may comprise a first headphone assembly 102 and which may have a first acoustic chamber surround 118. The first acoustic chamber assembly 108 may further have an acoustic chamber dividing partition 116. The acoustic chamber dividing partition 116 may result in sub-dividing the first acoustic chamber surround 118 into four distinct sub-chambers, at least two being acoustic low frequency sub-chamber 114.

Herein described may be an embodiment of a surround sound headphone device 100 for the production of surround sound which may comprise a first headphone assembly 102 and which may have a first acoustic chamber surround 118. The first acoustic chamber assembly 108 may further have an acoustic chamber dividing partition 116. The acoustic chamber dividing partition 116 may result in sub-dividing the first acoustic chamber surround 118 into five distinct sub-chambers, at least two being acoustic low frequency sub-chamber 114.

Herein described may be an embodiment of a surround sound headphone device 100 for the production of surround sound which may comprise a one or more than one high frequency external port 122. Herein described may be an embodiment of a surround sound headphone device 100 for the production of surround sound which may comprise a plurality of high frequency external port 122. Herein described may be an embodiment of a surround sound headphone device 100 for the production of surround sound which may comprise a sufficient number of high frequency external port 122 to support a predetermined number of high frequency auditory source 134 or a low frequency auditory source 136 or a low frequency auditory source 136 and high frequency auditory source 134.

Herein described may be an embodiment of a surround sound headphone device 100 for the production of surround sound which may comprise a low frequency external port 124. Herein described may be an embodiment of a surround sound headphone device 100 for the production of surround sound which may comprise a one or more than one low frequency external port 124. Herein described may be an embodiment of a surround sound headphone device 100 for the production of surround sound which may comprise a plurality of low frequency external port 124. Herein described may be an embodiment of a surround sound headphone device 100 for the production of surround sound which may comprise a sufficient number of low frequency external port 124 to support a predetermined number of high frequency auditory source 134 or a low frequency auditory source 136 or a low frequency auditory source 136 and high frequency auditory source 134.

Herein described may be an embodiment of a surround sound headphone device 100 for the production of surround sound which may comprise a low frequency high frequency port 126. Herein described may be an embodiment of a surround sound headphone device 100 for the production of surround sound which may comprise a one or more than one low frequency high frequency port 126. Herein described may be an embodiment of a surround sound headphone device 100 for the production of surround sound which may comprise a plurality of low frequency high frequency port 126. Herein described may be an embodiment of a surround sound headphone device 100 for the production of surround sound which may comprise a sufficient number of low frequency high frequency port 126 to support a predetermined number of high frequency auditory source 134 or a low frequency auditory source 136 or a low frequency auditory source 136 and high frequency auditory source 134.

Herein described may be an embodiment of a surround sound headphone device 100 for the production of surround sound which may comprise a high frequency high frequency port 128. Herein described may be an embodiment of a surround sound headphone device 100 for the production of surround sound which may comprise a one or more than one high frequency high frequency port 128. Herein described may be an embodiment of a surround sound headphone device 100 for the production of surround sound which may comprise a plurality of high frequency high frequency port 128. Herein described may be an embodiment of a surround sound headphone device 100 for the production of surround sound which may comprise a sufficient number of high frequency high frequency port 128 to support a predetermined number of high frequency auditory source 134 or a low frequency auditory source 136 or a low frequency auditory source 136 and high frequency auditory source 134.

Herein described may be an embodiment of a surround sound headphone device 100 for the production of surround sound which may comprise a high frequency auditory source 134. Herein described may be an embodiment of a surround sound headphone device 100 for the production of surround sound which may comprise a one or more than one high frequency auditory source 134. Herein described may be an embodiment of a surround sound headphone device 100 for the production of surround sound which may comprise a plurality of high frequency auditory source 134.

Herein described may be an embodiment of a surround sound headphone device 100 for the production of surround sound which may comprise a low frequency auditory source 136. Herein described may be an embodiment of a surround sound headphone device 100 for the production of surround sound which may comprise a one or more than one low frequency auditory source 136. Herein described may be an embodiment of a surround sound headphone device 100 for the production of surround sound which may comprise a plurality of low frequency auditory source 136.

While embodiments of the present disclosure have been illustrated and described, it is not intended that these embodiments illustrate and describe all possible forms of this disclosure. Rather, the words used in the specification are words of description rather than limitation, and it is understood that various changes may be made without departing from the spirit and scope of the disclosure.

Accordingly, it is not intended that the various embodiments be limited except by the appended claims. Insofar as the description above and the accompanying drawings disclose any additional subject matter that is not within the scope of the claims below, the embodiments are not dedicated to the public and the right to file one or more applications to claim such additional embodiments is reserved.

What is claimed is:

1. A headphone for the production of surround sound, comprising:

a first headphone assembly having a first acoustic chamber surround, the first acoustic chamber surround enveloping a first acoustic chamber assembly, the first acoustic chamber assembly further having, (a) an acoustic chamber dividing partition, (b) a one or more than one high frequency external port, (c) a low frequency external port, (d) a one or more than one low frequency high frequency port, (e) a high frequency high frequency port, (f) a one or more than one high frequency auditory source, and;

(g) a low frequency auditory source.

2. The headphone for the production of surround sound of claim 1, wherein the acoustic chamber dividing partition partitions the first acoustic chamber assembly into a one or more than one acoustic high frequency sub-chamber and a one or more than one acoustic low frequency sub-chamber, and is enveloped by the first acoustic chamber surround.

3. The headphone for the production of surround sound of claim 2, wherein the low frequency auditory source is disposed to the one or more than one acoustic low frequency sub-chamber, the one or more than one high frequency auditory source being positioned such that each said one or more than one acoustic high frequency sub-chamber has at least one high frequency auditory source.

4. The headphone for the production of surround sound of claim 2, wherein the one or more than one high frequency external port and the low frequency external port being disposed to the first acoustic chamber surround, said one or more than one high frequency external port aligning with said one or more than one acoustic high frequency sub-chamber and said low frequency external port aligning with said one or more than one acoustic low frequency sub-chamber.

5. The headphone for the production of surround sound of claim 2, wherein the low frequency high frequency port and the high frequency high frequency port being disposed to the acoustic chamber dividing partition, said low frequency high frequency port, aligning with at least one said acoustic high frequency sub-chamber and said one or more than one acoustic low frequency sub-chamber and the high frequency high frequency port being aligned with at least two acoustic high frequency sub-chamber.

6. The headphone for the production of surround sound of claim 1, wherein all of said one or more than one high frequency external port, said low frequency external port, said one or more than one low frequency high frequency port, and said high frequency high frequency port providing for a passage of pressure waves.

7. The headphone for the production of surround sound of claim 1, wherein each of said high frequency auditory source therein defining a high frequency vector originating plane and said low frequency auditory source therein defining a low frequency vector originating plane, said high frequency vector originating plane and low frequency vector originating plane producing a normal vector direction, said normal vector direction being directed to a focal point.

8. A surround sound headphone device, comprising:

a first acoustic chamber assembly and a second acoustic chamber assembly, the first acoustic chamber assembly having a first acoustic chamber surround and the second acoustic chamber assembly having a second acoustic chamber surround;

the first acoustic chamber assembly and the second acoustic chamber assembly each further having an acoustic chamber dividing partition;

the acoustic chamber dividing partition further having a one or more than one low frequency high frequency port and a one or more than one high frequency high frequency port;

the first acoustic chamber surround and the second acoustic chamber surround further having a one or more than one high frequency external port and a one or more than one low frequency external port;

the first acoustic chamber assembly and the second acoustic chamber assembly further having one or more than one high frequency auditory source and a one or more than one low frequency auditory source; said one or more than one high frequency auditory source and one or more than one low frequency auditory source being configured for production of pressure waves for sound reproduction; and wherein the one or more than one high frequency auditory source defining a high frequency vector originating plane therein and the one or more than one low frequency auditory source defining a low frequency vector originating plane therein; said high frequency vector originating plane and said low frequency vector originating plane each having a normal vector direction, said normal vector direction being directed to a focal point.

9. The surround sound headphone device of claim 8, wherein the first acoustic chamber surround and the second acoustic chamber surround are configured for connective communication by a headband assembly therein.

10. The surround sound headphone device of claim 8, wherein the acoustic chamber dividing partition of the first acoustic chamber surround is enveloped by the first acoustic chamber and, the acoustic chamber dividing partition of the of the second acoustic chamber surround is enveloped by the second acoustic chamber surround.

11. The surround sound headphone device of claim 10, wherein the acoustic chamber dividing partition is configured to subdivide the first headphone assembly and the second headphone assembly into one or more than one acoustic high frequency sub-chambers and one or more than one acoustic low frequency sub-chambers.

12. The surround sound headphone device of claim 11, wherein said low frequency high frequency port is configured such that air pressure communication is achieved between said one or more than one acoustic high frequency sub-chamber and said one or more than one acoustic low frequency sub-chamber; and, wherein said high frequency high frequency port is configured such that air pressure communication is achieved between any two said one or more than one acoustic high frequency sub-chambers.

13. The surround sound headphone device of claim 11, wherein the one or more than one low frequency external port is further configured to align with a one or more than one low frequency sub-chamber such that pressure waves from the low frequency auditory source pass through the one or more than one low frequency external port and;

wherein the one or more than one high frequency external port is further configured to align with a one or more than one high frequency sub-chambers such that pressure waves from the high frequency auditory source pass through the one or more than one high frequency external port.

14. An auditory headphone for the production of surround sound, comprising:

a first headphone assembly having a first acoustic chamber surround;

a second headphone assembly having a second acoustic chamber surround;

the first acoustic chamber surround enveloping a first acoustic chamber assembly;

the second acoustic chamber surround enveloping a second acoustic chamber assembly;

both the first acoustic chamber assembly and the second acoustic chamber assembly further having, an acoustic chamber dividing partition, a one or more than one high frequency external port, a low frequency external port, a one or more than one low frequency high frequency port, a high frequency high frequency port, a one or more than one high frequency auditory source, and;

a low frequency auditory source.

15. The headphone for the production of surround sound of claim 14, wherein the acoustic chamber dividing partition partitions the first acoustic chamber assembly and the second acoustic chamber assembly into a one or more than one acoustic high frequency sub-chamber and a one or more than one acoustic low frequency sub-chamber.

16. The headphone for the production of surround sound of claim 15, wherein the low frequency auditory source is disposed to the one or more than one acoustic low frequency sub-chamber, the one or more than one high frequency auditory source being positioned such that each acoustic high frequency sub-chamber has at least one high frequency auditory source.

17. The headphone for the production of surround sound of claim 15, wherein the one or more than one high frequency external port and the low frequency external port being disposed to the first acoustic chamber surround and the second acoustic chamber surround, said one or more than one high frequency external port aligning with said one or more than one acoustic high frequency sub-chamber and said low frequency external port aligning with said one or more than one acoustic low frequency sub-chamber.

18. The headphone for the production of surround sound of claim 15, wherein the low frequency high frequency port and the high frequency high frequency port being disposed to the acoustic chamber dividing partition, said low frequency high frequency port aligning with at least one said acoustic high frequency sub-chamber and said one or more than one acoustic low frequency sub-chamber and the high frequency high frequency port being aligned with at least two acoustic high frequency sub-chambers.

19. The headphone for the production of surround sound of claim 16, wherein all of said one or more than one high frequency external port, said low frequency external port, said one or more than one low frequency high frequency port, and said high frequency high frequency port providing passage for pressure waves.

20. The headphone for the production of surround sound of claim 15, wherein each of said high frequency auditory source therein defining a high frequency vector originating plane and said low frequency auditory source therein defining a low frequency vector originating plane, said high frequency vector originating plane and low frequency vector originating plane producing a normal vector direction, said normal vector direction being directed to a focal point.

* * * * *